United States Patent
Park et al.

(10) Patent No.: US 10,359,901 B2
(45) Date of Patent: Jul. 23, 2019

(54) METHOD AND APPARATUS FOR PROVIDING INTELLIGENT SERVICE USING INPUTTED CHARACTER IN A USER DEVICE

(71) Applicant: Samsung Electronics Co. Ltd., Suwon-si, Gyeonggi-do (KR)

(72) Inventors: Sehwan Park, Hwaseong-si (KR); Jihoon Kim, Seoul (KR); Sungwook Park, Goyang-si (KR); Jaeyong Lee, Seoul (KR); Jihoon Lee, Seoul (KR); Dongyeol Lee, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 533 days.

(21) Appl. No.: 14/017,051

(22) Filed: Sep. 3, 2013

(65) Prior Publication Data
US 2014/0068497 A1    Mar. 6, 2014

(30) Foreign Application Priority Data

Aug. 31, 2012 (KR) .......... 10-2012-0096478

(51) Int. Cl.
*G06F 3/0481* (2013.01)
*G06F 17/27* (2006.01)
*G06F 3/023* (2006.01)

(52) U.S. Cl.
CPC .......... *G06F 3/0481* (2013.01); *G06F 3/0237* (2013.01); *G06F 17/276* (2013.01)

(58) Field of Classification Search
CPC ....... G06F 3/0481–0482; G06F 3/0237; G06F 17/276

USPC ......................................... 715/780, 810, 835
See application file for complete search history.

(56) References Cited

U.S. PATENT DOCUMENTS

| | | | |
|---|---|---|---|
| 5,347,629 | A | 9/1994 | Barrett et al. |
| 5,751,922 | A | 5/1998 | Harada |
| 7,389,221 | B1 | 6/2008 | Pearson et al. |
| 2004/0006749 | A1 | 1/2004 | Fux et al. |
| 2005/0165973 | A1 | 7/2005 | Nakayama et al. |
| 2007/0257888 | A1 | 11/2007 | Chan |

(Continued)

FOREIGN PATENT DOCUMENTS

| | | |
|---|---|---|
| CN | 101685369 A | 3/2010 |
| CN | 101827171 A | 9/2010 |

(Continued)

OTHER PUBLICATIONS

Wenku; xibert google input method lua expansion series guidelines; https://wenku.baidu.com/view/2248625c312b3169a451a4a7/html.

*Primary Examiner* — Roland J Casillas
(74) *Attorney, Agent, or Firm* — Jefferson IP Law, LLP

(57) ABSTRACT

A method of providing a service using a keypad is provided. The method includes displaying a text box and a keypad on an executed screen, inputting a start identifier according to a selection of a smart conversion button of the keypad, inputting a command after the identifier, inputting a termination identifier after the command, performing an intelligent service according to the command when the termination identifier is inputted, and outputting a result according to the intelligent service in the text box.

24 Claims, 35 Drawing Sheets

(56) References Cited

U.S. PATENT DOCUMENTS

| | | | |
|---|---|---|---|
| 2008/0168366 A1* | 7/2008 | Kocienda | G06F 3/0237 |
| | | | 715/764 |
| 2010/0153091 A1 | 6/2010 | Kung et al. | |
| 2011/0154173 A1 | 6/2011 | Herlein | |
| 2012/0016678 A1 | 1/2012 | Gruber et al. | |
| 2012/0056816 A1 | 3/2012 | Ettinger | |
| 2012/0081286 A1* | 4/2012 | Kennedy et al. | 345/168 |
| 2012/0094724 A1 | 4/2012 | Wu | |
| 2012/0192096 A1* | 7/2012 | Bowman | G06F 3/0481 |
| | | | 715/780 |

FOREIGN PATENT DOCUMENTS

| | | | |
|---|---|---|---|
| CN | 101882007 A | 11/2010 | |
| CN | 102364424 A | 2/2012 | |
| EP | 0 938 799 B1 | 2/2003 | |
| EP | 1 540 452 B1 | 8/2011 | |
| EP | 2 479 647 A1 | 7/2012 | |
| FR | 2 928 752 A1 | 9/2009 | |
| JP | 61-166676 A | 7/1986 | |
| JP | 06-149490 A | 5/1994 | |
| JP | 2005-208926 A | 8/2005 | |
| JP | 2007-299375 A | 11/2007 | |
| JP | 2011-43894 A | 3/2011 | |
| JP | 2011-215878 A | 10/2011 | |
| JP | 2012-502351 A | 1/2012 | |
| JP | 2012-511759 A | 5/2012 | |
| WO | 2004006081 A2 | 1/2004 | |
| WO | 2011/088053 A2 | 7/2011 | |
| WO | WO 2014000251 A1 * | 1/2014 | G06F 17/3064 |

* cited by examiner

METHOD AND APPARATUS FOR PROVIDING INTELLIGENT SERVICE USING INPUTTED CHARACTER IN A USER DEVICE

PRIORITY

This application claims the benefit under 35 U.S.C. § 119(a) of a Korean patent application filed on Aug. 31, 2012 in the Korean Intellectual Property Office and assigned Serial No. 10-2012-0096478, the entire disclosure of which is hereby incorporated by reference.

BACKGROUND OF THE INVENTION

1. Field of the Invention

The present invention relates to a method and apparatus for providing an additional service of a user device. More particularly, the present invention relates to a method and apparatus for providing an intelligent service using an inputted character in a user device and executing a command corresponding to the character so as to provide related information.

2. Description of the Related Art

Recently, along with the development of digital technologies, various portable terminals capable of communicating and processing personal information while providing mobility for the user, such as a Personal Digital Assistant (PDA), an electronic organizer, a smartphone, a tablet personal computer, and the like are being introduced. Such a portable terminal is reaching a mobile convergence phase by including functions that were previously provided exclusively by other terminals in addition to the traditional communication function of the portable terminal Representatively, the portable terminal may have various functions including a calling function such as a voice call and a video call, a message transmission and reception function such as a Short Message Service (SMS), a Multimedia Message Service (MMS) and an e-mail, an electronic organizer function, a photographing function, a broadcast replay function, a moving-image replay function, a music replay function, an Internet function, a message function, a Social Network Service (SNS), and the like.

In particular, the portable terminal may support various character inputs of a user by a character input function using a keypad (or a keyboard). For example, the portable terminal may support a character input in various functions such as a message, an e-mail, a messenger, Internet, or SNS, and the user may input various characters (e.g., a chatting characters, message writing characters, search word, etc.) by activating the keypad in the execution screen of the function executed when using various functions.

In such a portable terminal of the related art, a character corresponding to a key (button) selected by the user using a keypad is inputted. Hence, in such a portable terminal, only characters corresponding to the key selected by the user using the keypad are outputted. That is, only a simple designated character input function is being performed in the portable terminal. Furthermore, in such a portable terminal, an input is possible by only a language (e.g., a mother tongue, English, etc.) that is supported by an activated keypad, and thus when trying to perform an input for a language that is not supported, an input is possible only after searching for and installing a keypad that supports the language. Further, when the user tries to acquire various information (e.g., information on weather, movies, translation, search, etc.), a complicated user device operation must be performed to acquire the information. For example, when trying to check weather information while executing and using a certain function in the user device, the existing function under execution should be stopped, and thereafter an Internet function should be executed to be connected to a provider server (e.g., a Meteorogical Office server or a web server, etc.) that provides weather information. Then, when connected to the provider server, weather information may be provided by a procedure such as searching for the weather of a desired region in the connected provider server.

Accordingly, there is a need for an improved apparatus and method for using a keypad of a user device.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above-mentioned problems and/or disadvantages and to provide at least the advantages described below. Accordingly, an aspect of the present invention is to provide a method and apparatus for using, by a user, various intelligent services using a keypad of a user device.

Another aspect of the present invention is to provide a method and apparatus for providing an intelligent service capable of recognizing a character inputted through a keypad and executing a command corresponding to the character to provide related information.

Another aspect of the present invention is to provide a method and apparatus for providing an intelligent service capable of improving convenience and usability of a user device by implementing an optimal environment for providing various intelligent services in real time using an input character in a user device.

In accordance with an aspect of the present invention, a method of providing a service using a keypad is provided. The method includes displaying a text box and a keypad on an executed screen, inputting a start identifier according to a selection of a smart conversion button of the keypad, inputting a command after the identifier, inputting a termination identifier after the command, performing an intelligent service according to the command when the termination identifier is inputted, and outputting a result according to the intelligent service in the text box.

In accordance with another aspect of the present invention, a method of a service using a keypad is provided. The method includes displaying a keypad on a performance screen, generating a command in response to a user's input using the keypad, determining a service performance according to the generated command, determining whether there is a parameter inputted before the command when the service is performed, performing the service according to the command based on the parameter if there is such a parameter, and displaying a result of the performance of the service, and performing the service according to the command if there is no such a parameter, and displaying a result of the performance of the service.

In accordance with another aspect of the present invention, a computer readable recording medium recording a program for executing the method by a processor is provided.

In accordance with another aspect of the present invention, a user device is provided. The user device includes a display unit for displaying a text box and a keypad on a performance screen of an application, for displaying a command candidate region linked with the keypad and at least one command candidate group in the command candidate group region, and for displaying a result of a performance of an intelligent service on the text box, a storage unit for storing a command table for an intelligent service, and a controller for controlling a selection of a smart conversion button of the keypad or an input of a start identifier, a command and a termination identifier according to a user's input and for controlling performance of the intelligent service according to a command between the identifiers so that a result of the performance of the intelligent service is inputted and displayed on the text box.

In accordance with another aspect of the present invention, an apparatus for supporting an intelligent service is provided. The apparatus includes a keypad user interface for providing a keypad on a performance screen, an input manager for supporting a character input by the keypad, for inputting a result transmitted from a command controller to a text box of the performance screen, and for exchanging a character of a command type of a previously inputted start identifier, command and termination identifier for a text of the result when the result is inputted, the command controller for obtaining a result by performance of an internal service or an external service for the command according to a result of analysis on the command of a command parser, and for controlling an output of the obtained result, if an input of a text of the command type of the start identifier, the command and the termination identifier, the command parser for extracting a command between the identifiers if the text is transmitted, for analyzing whether the extracted command corresponds to a command designated in a command table, and for providing a result of the analysis to the command controller, a network binder for obtaining a dynamic result for the command from the external service through a service Application Program Interface (API) or web parsing if the command is transmitted from the command controller, and the command table for storing preset commands and service information corresponding to each of the commands.

In accordance with another aspect of the present invention, a system for supporting an intelligent service is provided. The system includes a user device for controlling an input of a start identifier, a command and a termination identifier according to a user's input or a selection of a smart conversion button of a keypad, for performing an intelligent service according to a command between the identifiers through an internal or external server, and for inputting and displaying a result of the performance of the intelligent service on the text box, and an integrated service for generating a result by performing an intelligent service according to the command, and for providing the generated result to the user device when performance of the intelligent service is requested from the user device.

In accordance with another aspect of the present invention, a recording medium is provided. The recording medium processes a display of a text box and a keypad on a performance screen of an application, controls an input of a start identifier, a command and a termination identifier according to a user's input or a selection of a smart conversion button using the keypad, extracts a command between the identifiers when the termination identifier is inputted, obtains a result after performing a service according to the extracted command, and inputs and displays the obtained result on the text box.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The present invention relates to a method and apparatus for providing an intelligent service in a user device. According to exemplary embodiments of the present invention, a command corresponding to a character inputted through a keypad or a keyboard of a user device may be recognized and related information corresponding to a recognized command may be processed (e.g., acquired) and fed back to user.

According to exemplary embodiments of the present invention, a certain key (or button) may be allocated as a key (hereinafter, a smart conversion button (or a command identifier button)) for commanding an intelligent service operation in a keypad of a user device. Further, a user may select the smart conversion button, and input the character (or string) of a desired command. The user device may distinguish a parameter from a command in characters inputted in a location where a smart conversion button has been pushed, i.e., an identifier for distinguishing a command in the present invention. Further, the user device may recognize an identified command and execute an intelligent service corresponding to the recognized command, and provide the result to user.

Figure 1:
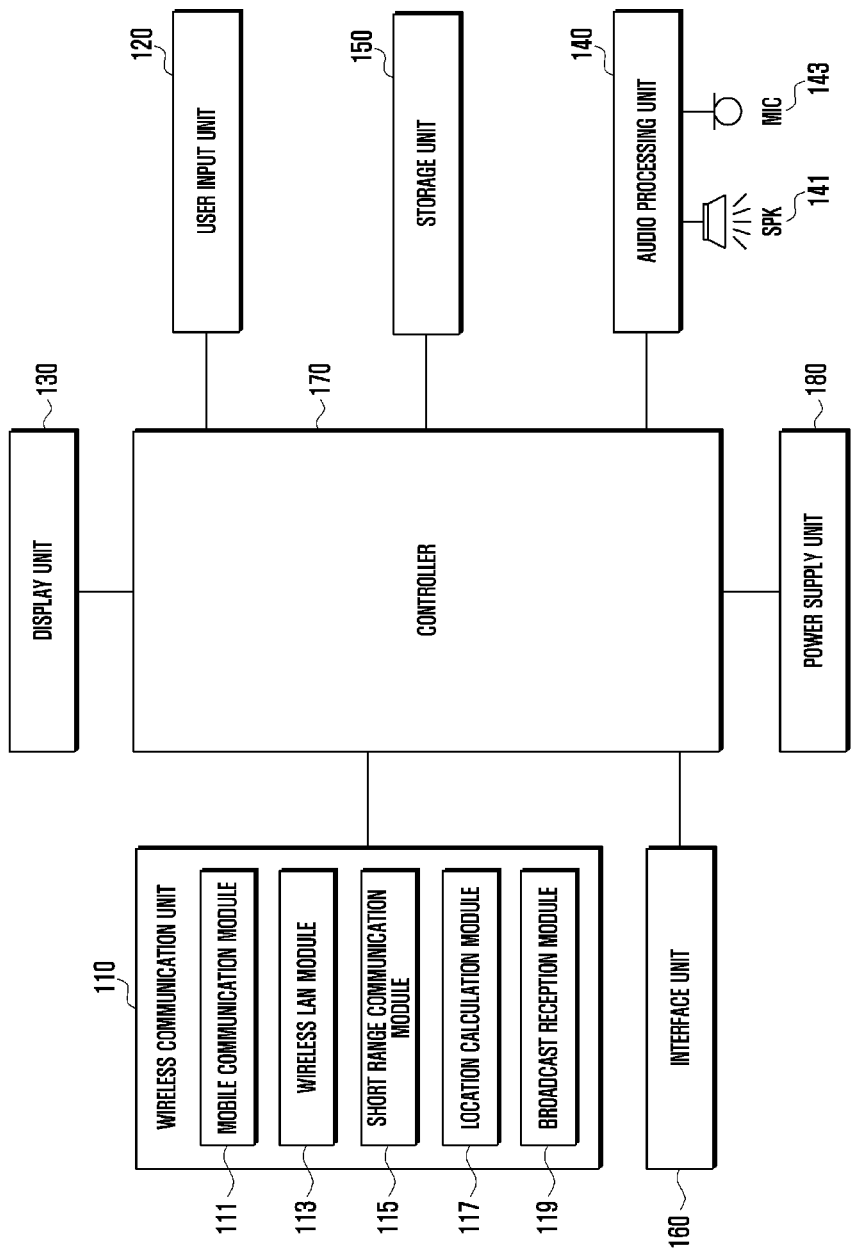
FIG. 1 schematically illustrates a configuration of a user device according to an exemplary embodiment of the present invention.

FIG. 1 schematically illustrates a configuration of a user device according to an exemplary embodiment of the present invention.

Referring to FIG. 1, a user device may include a wireless communication unit 110, a user input unit 120, a display unit 130, an audio processing unit 140, a storage unit 150, an interface unit 160, a controller 170 and a power supply unit 180. The components illustrated in FIG. 1 are not essential in the user device of the present invention, and thus the user device may be implemented to have more components or fewer components.

The wireless communication unit 110 may include one or more modules which allow wireless communication between a user device and a wireless communication system or between the user device and a network where another device is located. For example, the wireless communication unit 110 may include a mobile communication module 111, a wireless Local Area Network (WLAN) module 113, a short range communication module 115, a location calculation module 117 and a broadcast reception module 119.

The mobile communication module 111 may transmit and receive wireless signals to and from a base station, an external terminal and at least one of various servers (e.g., an integration server, a search server, a movie information providing server, a weather information providing server, a translator server, etc.). The wireless signal may include various forms of data according to transmission and reception of a voice call signal, a video call signal or a text/multimedia message. The mobile communication module 111 may connect to at least one of the various servers according to the control of the controller 170 and related information of the intelligent service corresponding to the user request.

The wireless LAN module 113 represents a module for a wireless Internet connection, another user device and a wireless LAN link, and may be internally or externally installed in the user device. Some examples of the wireless Internet technology are a Wi-Fi, Wireless broadband (Wibro), World interoperability for microwave access (Wimax), and High Speed Downlink Packet Access (HSDPA). The wireless LAN module 113 may connect to at least one of the various servers and receive related information of an intelligent service corresponding to the user's request. Further, the wireless LAN module 113 may transmit or receive data according to the user's selection to or from another user device when the wireless LAN link is formed with another user device.

The wireless communication module 115 represents a module for a short range communication. Some examples of a short range communication technology that may be employed by the wireless communication module 115 include Bluetooth, Radio Frequency Identification (RFID), Infrared Data Association (IrDA), Ultra WideBand (UWB), and Near Field Communication (NFC). Further, the short range communication module 115 may transmit or receive data according to the user's selection to or from another user device when wireless connection is made with the other user device.

The location calculation module 117 is a module for acquiring the location of the user device. A representative example of the location calculation module 117 is a Global Position System (GPS) module. The location calculation module 117 may produce the three-dimensional current location information according to latitude, longitude and altitude by acquiring the distance from three or more base stations and accurate time information and applying trigonometry to the acquired information. Further, the location calculation module 117 may acquire location information by receiving the current location of the user device in real time from three or more satellites. That is, the location information of the user device may be acquired by various methods. The location calculation module 117 may acquire location information of the user device and provide the acquired information to the controller 170 according to control of the controller 170 when an intelligent service is executed.

The broadcast reception module 119 receives broadcast signals (e.g., a TV broadcast signal, a radio broadcast signal, a data broadcast signal, etc.) and/or information related with the broadcast (e.g., information related with a broadcast channel, a broadcast program or a broadcast service provider, etc.) from an external broadcast management server through a broadcast channel (e.g., a satellite channel, a ground wave channel, etc.).

The user input unit 120 generates input data for operation control of the user device. The user input unit 120 may be composed of a key pad, a dome switch, a touch pad (static pressure/static current), a jog wheel, a jog switch, etc. The user input unit 120 may be implemented having a button form at the outside of the user device, and some buttons may be implemented as a touch panel.

The display unit 130 may display (i.e., output) information processed in the user device. For example, if the user device is in a calling mode, the calling-related user interface or Graphic User Interface (GUI) are displayed. Further, the display unit 130 displays the photographed and/or received image or UI or GUI when the user device is in a video call mode or a photographing mode. More particularly, the display unit 130 displays an execution screen for various functions executed in the user device. Further, the display unit 130 may display an activated keypad on the execution screen according to control of the controller 170 in the execution screen, and may display letters according to the signal inputted through the keypad on the execution screen. Further, the display unit 130 may convert the screen according to the execution command of the intelligent service inputted by the keypad. Here, the screen conversion may include a conversion of letters inputted on the executed screen (e.g., converting inputted characters into related information acquired according to the intelligent service, etc.), and conversion of the executed screen into a new UI and GUI corresponding to the executed intelligent service. That is, in exemplary embodiments, the screen conversion may be formed by a scheme for converting only an inputted character into a drawn result and a scheme for converting the executed screen itself into a screen of a drawn result in a state where the current execution screen is maintained. This may be differently applied depending on the output method of the result information according to the intelligent service. An example of a screen of the display unit 130 operated in the present invention will be described later.

The display unit 130 may include at least one of a Liquid Crystal Display (LCD), a Thin Film Transistor LCD (TFT LCD), a Light Emitting Diode (LED), an Organic LED (OLED), an Active Matrix OLED (AMOLED), a flexible display, a bended display, and a 3D display. Some of such displays may be implemented as a transparent display formed as a transparent or optically transparent type so that the outside may be visible.

Further, when a touch panel for sensing a touch operation includes a layered structure (hereinafter, referred to as a touch screen), the display unit 130 may be used as an input device as well as an output device. The touch panel may be configured to convert a change of a pressure applied to a certain part of the display unit 130 or capacitance generated in a certain part of the display unit 130 into electric input signals. The touch panel may be formed to detect an input at the time of a touch as well as the touched location and area. When there is a touch input for a touch panel, the corresponding signals are sent to a touch controller (not shown). The touch controller (not shown) may process the signals and transmit the corresponding data to the controller 170. As such, the controller 170 may understand whether any part of the display unit 130 is touched.

The audio processing unit 140 may transmit an audio signal inputted from the controller 170 to the speaker 141, and may perform a function of transmitting audio signals such as a voice inputted from the microphone 143 to the controller 170. The audio processing unit 140 may convert voice/sound data into audible sounds and output the audible sounds through the speaker 141 according to control of the controller 170, and may convert audio signals such as sounds received from the microphone 143 into digital signals and transmit the digital signals to the controller 170.

The speaker 141 may output audio data received from the wireless communication unit 110 at a calling mode, a recording mode, a media content replay mode, a photographing mode, a broadcast receiving mode, etc., or may output audio data stored in the storage unit 150. The speaker 141 may output sound signals related with the function performed in the user device (e.g., a call connection reception, a call connection transmission, a music file replay, a video file replay, etc.).

The microphone 143 receives external sound signals from a calling mode, a recording mode, a sound recognition mode, a photographing mode, etc. and processes the received signals as electric sound data. The processed sound data may be converted into a form that may be transmitted to the mobile communication base station and may then be outputted in the case of a calling mode. Further, various noise removing algorithms for removing noises generated in the process of receiving external sound signals may be implemented.

The storage unit 150 may store a program for processing and control of the controller 170, and may temporarily store inputted/outputted data (e.g., an identifier, command, phone number, message, audio, media contents (e.g., a music file, video file), an electronic book, etc.). The storage unit 150 may store a use frequency according to the operation of the user device function (e.g., an application use frequency, a media content replay frequency, a use frequency of a phone number, a message and a multimedia, etc.), importance, priority and preference. The storage unit 150 may store data related with the sounds and vibration of various patterns outputted at the time of a touch input on the touch screen. More particularly, the storage unit 150 may store an identifier for identifying the start of the command for execution of an intelligent service and various commands for execution of an intelligent service in the present invention.

In exemplary embodiments of the present invention, the identifier may be implemented by one or a combination of various symbols such as "*", "[#]", "&&", etc. The identifier may be implemented as certain characters which do not bother the character input of the user. Further, the identifier may be set according to the user's definition, and the set identifier may be automatically mapped to the smart conversion button. That is, when the smart conversion button is pushed by the user, the identifier set in the text box (e.g., a character input window, a search window, a message input window, etc.) may be automatically inputted.

In exemplary embodiments of the present invention, the command may be implemented as predefined characters (e.g., a character string), and characters inputted by user. The command may use a style having a certain form, or a colloquial style may be used.

Further, in the case of execution of an intelligent service by a command, an application execution, search and conversion, etc. may be performed in the user device. Such an example is shown in Table 1 to Table 3. Table 1 to Table 3 show examples of a command table according to an exemplary embodiment of the present invention. However, it is to be understood that the present invention is not limited thereto, and the command table may have various command systems.

TABLE 1

| Command | Details of performance (example) |
| --- | --- |
| Translate Japanese | Japanese translation is performed based on the text inputted by the user before and is then outputted (Japanese translation information is translated using Open API that provides a translation service, and then the translated text is outputted). |
| Translate English | English translation is performed based on the text inputted by the user before identifier such as "hello" and is then outputted (English translation information is translated using Open API that provides a translation service, and then the translated text is outputted). |
| Translate Chinese | Chinese translation is performed based on the text inputted by the user before and is then outputted (Chinese translation information is translated using Open API that provides a translation service, and then the translated text is outputted). |

TABLE 2

| Command | Details of performance (example) |
| --- | --- |
| Greeting (Thanks) | Output "Thank you very much for your help and love." |
| Greeting (New year's greeting) | Output characters corresponding to a new year's greeting such as "Happy new year and stay healthy!" |
| Happy day | Output characters corresponding to a happy day such as "( _ ) Have a happy day with a smile like Buddha." |
| Birthday celebration | Output "I appreciate your beautiful birth in this beautiful world. Happy birthday to you." |
| Weather (Today's weather) | Extract region based on current user's GPS through Open API as in "cloudy and showers in Seoul", acquire information on the weather of the extracted region through server that provides weather open API, and output the information in a text form. |
| Weather of Busan (Today's weather of Busan) | Parse "Busan" which is a variable as in "Sunny and showers in Busan", extract the weather information of Busan through Open API, and output the information. |

TABLE 3

| Command | Details of performance (example) |
| --- | --- |
| Capture | Capture current screen. |
| Location (Current location) | Acquire location information based on current user's GPS as in "Maetan-dong 2, Youngtong-gu, Suwon-si, Gyunggi-do", and output the location information. |
| Expression (angry expression) | Output an emoticon corresponding to an angry expression "-.-". |
| Music play | Execute a music player. |
| Movie (Movie play table) | Extract list of movies currently under play through Open API or a search of various sites, and output the list in a text form. |
| Mega box | Input a certain theater name, extract information on movies currently playing through Open API or a search of sites, and output the information in a text form. |
| Lowest price Nike Air | Acquire lowest price or product sale link corresponding to product name such as "Nike Air 85,000 Won (Auction: http://www.auction.co.kr/items=1234)", and output lowest price information and sale site address. |
| biorhythm | Calculate user's today's biorhythm information or find information using Open API, and display the information. |
| Horoscope (name horoscope A B) | Display information on marital harmony between users A and B in a text form. |
| Azalea of Kim Sowol | Output content of poem corresponding to "When you leave if it is repulsive to see me, I'll send you with no saying." |
| Music video (ZZZ music video) | Output "www.youtube.com/taetiseo/zzz." |

The commands illustrated in Tables 1 to 3 are examples. That is, the present invention is not limited to the commands of Tables 1 to 3. Further, the commands may be implemented according to the names of all data (e.g., media, folder, contacts of the phonebook, message, e-mail, etc.) stored in the user device.

Further, the storage unit 150 may store at least one program for executing various functions related with the intelligent service support using an inputted character in the user device. Further, the storage unit 150 may store a platform of FIG. 2 to be described later.

The storage unit 150 may include a storage medium of at least one type among a flash memory type, a hard disk type, a micro type, a card type (e.g., SD card, XD card, etc.), a Random Access Memory (RAM), Static RAM (SRAM), Read-Only Memory (ROM), Programmable ROM (PROM), Electrically Erasable PROM (EEPROM), Magnetic RAM (MRAM), magnetic disk, optical disk type memory, etc. The user device may be operated in connection with web storage that performs the storage function of the storage unit 150 on the Internet.

The interface unit 160 serves as a passage with external devices connected to the user device. The interface unit 160 may receive data transmitted from the external device, may be supplied power and transmit the power to each component of the user device, or may transmit internal data of the user device to the external device. For example, the interface unit 160 may include a wired/wireless headset port, an external charger port, a wired/wireless data port, a memory card port, a port that connects a device including an identification module, an audio input/output port, a video input/output port, an earphone port, etc.

The controller 170 controls overall operation of the user device. For example, the controller 170 may perform control related to a voice call, a data communication, a video call, etc. The controller 170 may include a multimedia module (not shown) for operation related with a replay of media contents. In exemplary embodiments of the present invention, the multimedia module (not shown) may be may implemented within the controller 170 or may be implemented separately from the controller 170.

More particularly, the controller 170 controls a series of operations for supporting an intelligent service according to an exemplary embodiment of the present invention. That is, the controller 170 controls a selection of a smart conversion button of the keypad or an input of a start identifier and a command of a termination identifier, controls operation of an intelligent service according to commands between the identifiers, and controls a series of operations related to inputting the result of the operation of the intelligent service and displaying the result. Further, the controller 170 may control at least one command candidate group to be displayed in the command candidate group area according to the start identifier or the command input.

Further, if the termination identifier is inputted, the controller 170 determines performance of an intelligent service, extracts the command between the start identifier and the termination identifier at the time of determination of the performance of the intelligent service, and controls the performance of the intelligent service in response to the extracted command. Here, the controller 170 may determine whether the extracted command corresponds to a command designated in the command table, and if the command is a command in the command table, the controller 170 may control execution of the background of the intelligent service. In contrast, if the command is a command that is not in the command table, the controller 170 may be linked with an external server to control execution of the intelligent service corresponding to the command.

Further, if the command is a command that is not in the command table, the controller 170 may provide a function for additionally defining a command inputted to user, thereby controlling to additionally define the command and the details of execution on the command. That is, when a non-existing command is inputted, the controller 170 may control execution of an intelligent service of the command by the linkage with the external server according to a preset processing scheme by a non-existing command input, or may control a function for additionally registering the command in the command table.

Further, when a result according to the intelligent service is outputted in the text box, if the smart conversion button is selected, the controller 170 may control restoration of a screen in a state before the output of the result through the text box. That is, in a state where the result according to the execution of an intelligent service is outputted in the text box, if the smart conversion button is reselected, a conversion (e.g., restoration) into a screen before the intelligent service is processed may be made in response to the reselection, thereby controlling the screen output.

Here, the controller 170 may control overall operation related with the operation of the intelligent service by executing at least one program stored in the storage unit 150. For example, the at least one program may be a program that includes commands that display a text box and keypad on the execution screen of the application, input a start identifier according to a smart conversion button selection or user input of the keypad, input a command after the identifier, input a termination identifier after the command, perform an intelligent service according to the command when the termination identifier is inputted, and output the result according to the intelligent service in the text box.

An exemplary controller 170 and a control method thereof will be described below with reference to the drawings.

The power supply unit 180 receives external and internal power and supplies power necessary for operation of each component by control of the controller 170.

Various exemplary embodiments of the present invention may be implemented within a recording medium that may be readable by a computer or the like by using software, hardware or a combination thereof. According to hardware implementation, exemplary embodiments described in the present invention may be implemented by using at least one of application specific integrated circuits (ASICs), Digital Signal Processors (DSPs), Digital Signal Processing Devices (DSPDs), Programmable Logic Devices (PLDs), Field Programmable Gate Arrays (FPGAs), processors, controllers, micro-controllers, microprocessors and electric units for performing other functions. In some cases, the exemplary embodiments described herein may be implemented by the controller 170. According to software implementation, the exemplary embodiments as in the procedures and functions described herein may be implemented as separate software modules. Each of the software modules may perform one or more functions and operations described in the present specification.

Further, the user device of FIG. 1 may include all devices using an Application Processor (AP), a Graphic Processing Unit (GPU), a Central Processing Unit (CPU) such as all information communication devices, multimedia devices and their application device that support the functions of the present invention. For example, the user device may include devices such as a table PC, a smart phone, a digital camera, a Portable Multimedia Player (PMP), a media player, a portable game console, a laptop computer, a Personal Digital Assistant (PDA), etc. as well as a mobile communication terminal operated according to each communication protocol corresponding to various communication systems. Further, the method of controlling the function of the present invention may be applied to various display devices such as a digital TV, a digital signage, and a large format display.

Here, the recording medium may include a computer-readable recording medium having a program recorded thereon for displaying a text box and a keypad on the application execution screen, inputting a start identifier, a command and termination identifier according to a selection of a smart conversion button using the keypad and a user input, extracting a command between the identifiers when the termination identifier is inputted, acquiring the result by executing a service according to the extracted command, and inputting and displaying the acquired result in the text box.

Figure 2:
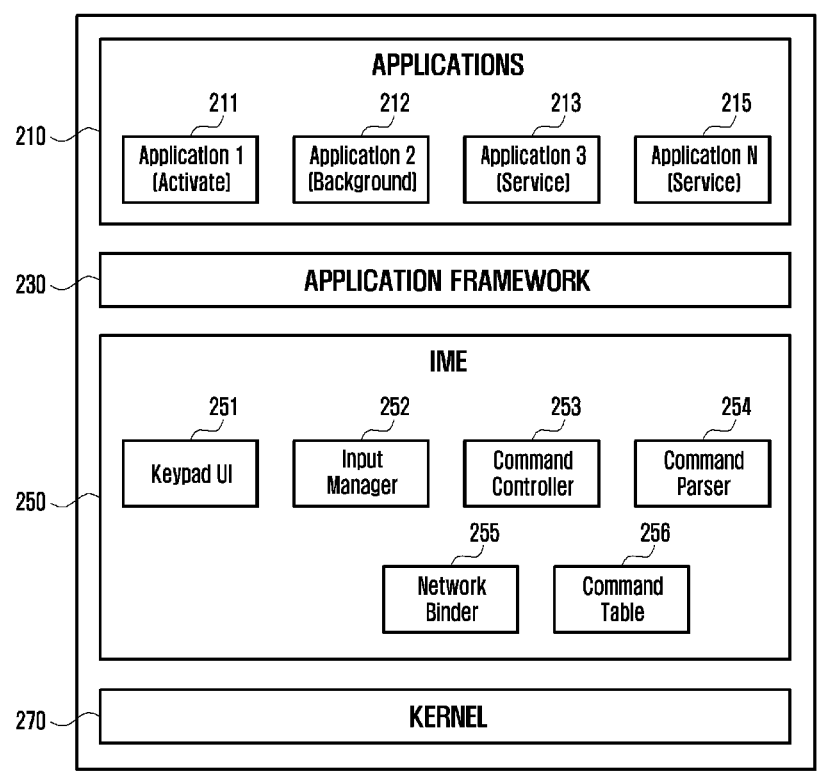
FIG. 2 schematically illustrates a platform structure of a user device according to an exemplary embodiment of the present invention.

FIG. 2 schematically illustrates a platform structure of a user device according to an exemplary embodiment of the present invention.

Referring to FIG. 2, the platform of the user device may include operating system-based software related with supporting an additional service in the user device. As illustrated in FIG. 2, the user device may include applications 210, an application framework 230, an Input Method Editor (IME) 250, and a kernel 270.

The applications 210 include various applications that may be operated and displayed within the user device (e.g., application 1 (211) and various applications that are performed as background (e.g., application 2 (212), application 3 (213) and application N (215)). Some examples of such applications are a UI application about various menus within the user device, and an application which is downloaded through an external device or a network and is stored, and may be freely installed or deleted by user. Through such applications within the layer of the applications 210, an Internet phone service by network connection, a Video On Demand (VOD) service, a web album service, a Social Network Service (SNS), a Location Based Service (LBS), a map service, a web search service, an application search service, a text/multimedia message service, a mail service, an address list service, a media replay service, etc. may be performed. Further, various functions such as a game and schedule management may be performed.

In exemplary embodiments of the present invention, a case of using application 1 (211) that operates as an activity and application 2 (212) that operates as a background or service among applications of the application 210 layer is illustrated, and it is assumed that the application 1 (211) is an editable widget that supports a character input through keypad activation and the application 2 (212) is a content player. Here, the activity may represent a component for configuring the UI screen, and the background or service may represent a component executed in the background without a visual UI.

The application framework 230 provides frameworks (e.g., various classes and methods) used by various applications within the layer of the applications 210. The application framework 230 may include a program which is the basis of the layer of the applications 210. The application framework 230 may be compatible with any application, and components may be reused, moved or exchanged. The framework 230 may include a support program and a program that connects other software components. For example, a resource manager, an activity manager related with the activity of the application, a notification manager, a content provider that summarizes the sharing information between applications, a message manager, a telephony manager, a window manager, a view system, etc. may be included.

The IME 250 represents a module for controlling a text input part at the time of a character input and voice input of the user. That is, when the user inputs a text using a user device or inputs a voice through a voice interface (e.g., a microphone 143, etc.), the IME 250 controls an input of a corresponding text. The IME 250 may be allocated and executed according to each application within the layer of the applications 210. The IME 250 may include a keypad UI 251, an input manager 252, a command controller 253, a command parser 254, a network binder 255, and a command table 256. The IME 250 allows a process related with the intelligent service using the keypad through the above configuration.

The keypad UI 251 provides a keypad on the application execution screen in response to the user's keypad activation request.

The input manager 252 supports character input by the keypad and inputs the result transmitted from the command controller in the text box of the execution screen. Here, the input manager 252 may allow the command type characters of the previously inputted start identifier, command, and termination identifier to be exchanged with the text of the result when the result is inputted. Further, the input manager 252 may allow the extracted text and the text of the result to be inputted together at the time of the input of the result.

The command controller 253 determines whether the characters inputted through the keypad have the command type for execution of the intelligent service. If the inputted characters have the command type, the command controller 253 determines whether the input of the text of the command type of the start identifier, the command and termination identifier has been completed. Further, if the input of the text of the command type is completed, the command controller 253 provides the text to the command parser 254. Thereafter, if it is confirmed by the command parser 254 that the command is a command in the command table, the command controller 253 internally executes the intelligent service and controls the output of the result.

Further, if it is confirmed by the command parser 254 that the command is a command that is not in the command table, the command controller 253 controls the output of the result received from an external server (e.g., an integrated server, a content server, etc.) through the network binder 255. That is, the command controller 253 controls the internally or externally obtained result to be transmitted to the input manager 252, to be inputted to the text box and to be displayed.

If the text having the command type is transmitted from the command controller 253, the parser 254 extracts a command between the text identifiers. Further, the command parser 254 analyzes whether the extracted command corresponds to the command designated in the command table 256, and transmits the result to the command controller.

If the command is transmitted from the command controller 253, the network binder 255 obtains the dynamic result for the command from the external server through the service Application Program Interface (API) or web parsing, and transmits the result to the command controller 253.

The command table 256 stores preset commands and service information corresponding to each command.

An example of an operation provided by the intelligent service in the user device having the above configuration is described below.

If a user requests keypad activation by giving a focus in a certain application (e.g., the editable widget 211), the keypad UI 213 may activate and display the keypad on the execution screen of the application. Further, if user inputs characters through the activated keypad, the input manager 252 may determine whether the currently inputted character corresponds to the character (i.e., identifier) for identifying the command for the intelligent service. That is, the command controller 253 may determine whether the character inputted through the keypad has the command type for execution of the intelligent service. Here, if it is determined by the command controller 253 that the inputted character is a character corresponding to the identifier, the input manager 252 waits for the user input (selection) until the designation of the command is completed.

Further, if the character inputted through the keypad has the command type and the input of the text of the command type by the start identifier, command and termination identifier is completed, the command controller 253 transmits the text of the command type to the command parser 254. Then, the command parser 254 extracts only the actual command except the identifiers from the text transmitted from the command controller 253, and determines whether the extracted command is a command designated in the local database from the command table 256. Further, the command parser 254 transmits the result of analysis on the command to the command controller 253.

If the command corresponds to the command designated in the command table 256 according to the analysis result received from the command parser 254, the command controller 253 processes the execution of the service according to the command and outputs the result according to the process. Here, if the command represents the execution of the service (e.g., the function, the application, etc.) of the system such as "content player", not the output of the text result, the command controller 253 may request execution of the service to the application 210 that provides the service. For example, if it is assumed that the command is inputted as "content player" for execution of the content player and the service for executing the command is application 2 (212) of the layer of the applications 210, the command controller 253 requests the execution of service to the application 2 (212) in response to the execution of the intelligent service by the command.

Further, if the command corresponds to the command that is not designated in the command table 256 according to the analysis result from the command parser 254, the command controller transmits the command to the network binder 254. Then the network binder 254 transmits the command to an external server and requests a server response so that the result of execution of the corresponding service may be transmitted.

If the command is received from the network binder 255 of the user device, the external server may determine whether the received command is the command that may be executed by the server from the internal command table. Further, if it is determined that the command is a command that may be executed, the external server executes the service for the command and transmits the result of the execution to the network binder 255 of the user device. Here, if the command is the execution-impossible command (e.g., a command that requires a text result that is dynamically changed, not a simply matched text result type), another server, which is appropriate for the execution of the service according to the command, may be determined. Further, the external server may dynamically generate the text result through a service API or web parsing of the determined content server, and may transmit the text result to the network binder 255 of the user device.

If the text result for the requested command is received from the external server, the network binder 255 may transmit the received result to the command controller 253. The command controller 253 transmits the received text result to the input manager 252, and requests the input of the text result on the text box of the editable widget 211. Then, when the text result is received from the command controller 253, the input manager 252 inputs the text in the text box of the editable widget 211. Here, when the text result is inputted, the input manager 252 may process the text of the command type of the previously inputted start identifier, command and termination identifier to be exchanged with the text of the result. Further, when the text result is inputted, the input manager 252 may process the extracted command and the text of the result to be inputted together when the text result.

The kernel 270 is the core of the operating system, and when the user device is operated, at least one of the hardware driver operation, security of the hardware and processor within the user device, efficient management of system resources, memory management, provision of the interface on the hardware by hardware abstraction, the multi-process and service connection management may be performed. The hardware driver within the kernel 270 may include at least one of a displayer driver, an input device driver, a WiFi driver, a camera driver, a Bluetooth driver, a Universal Serial Bus (USB) driver, an audio driver, a power manager, a binder driver, a memory driver, etc.

Further, the platform may further include middleware (not shown). If included, the middleware (not shown) may be located between the kernel 270 and the layer of the applications 210, and may serve as a medium so that data may be exchanged between other hardware and software. As such, a standardized interface may be provided, and various environment support and mutual operations with other jobs may be possible.

Further, the above described platform may be used for a general purpose in various electronic devices as well as the user device of the present invention. Further, the platform may be stored or loaded in at least one of a separate processor (not shown) among the storage unit 150 and the controller 170. Further, a separate application (not shown) for execution of the application may be further provided.

Figure 3:
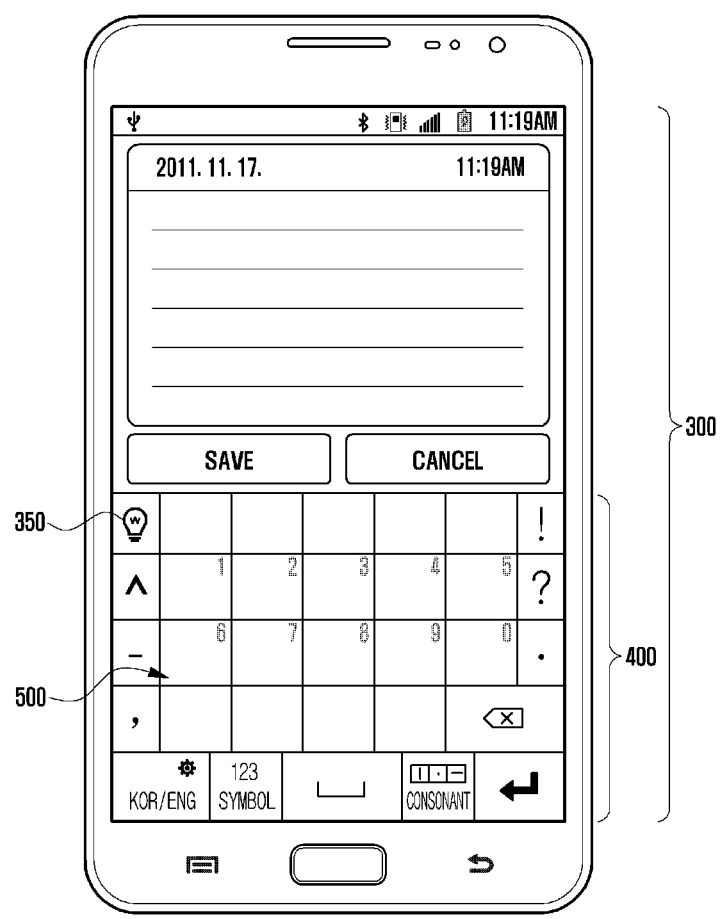
FIGS. 3 to 5 illustrate a screen interface for supporting an intelligent service in a user device according to an exemplary embodiment of the present invention.
Figure 4:
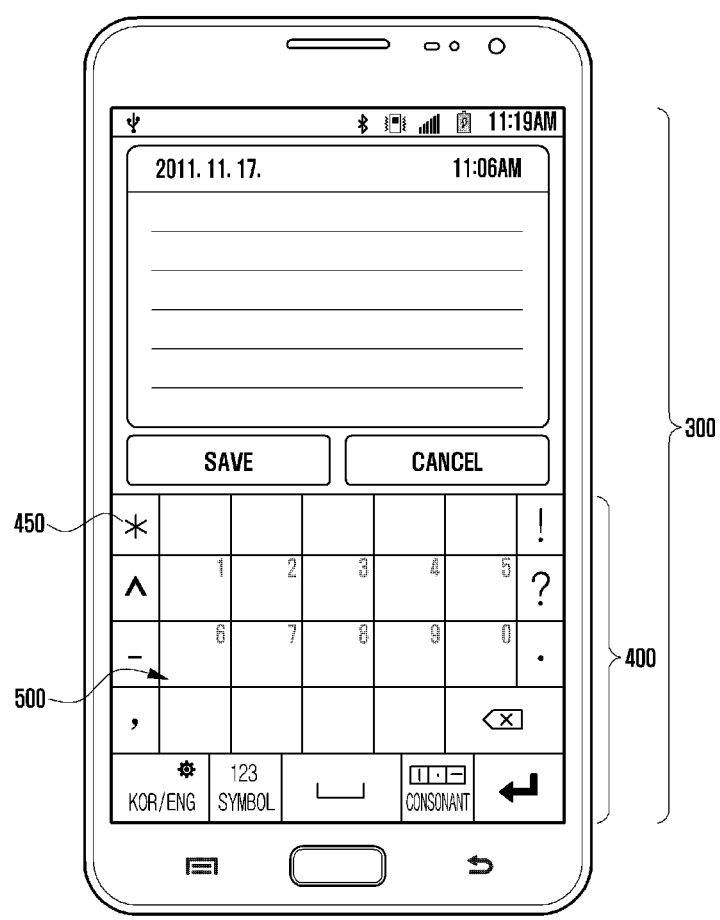
Figure 5:
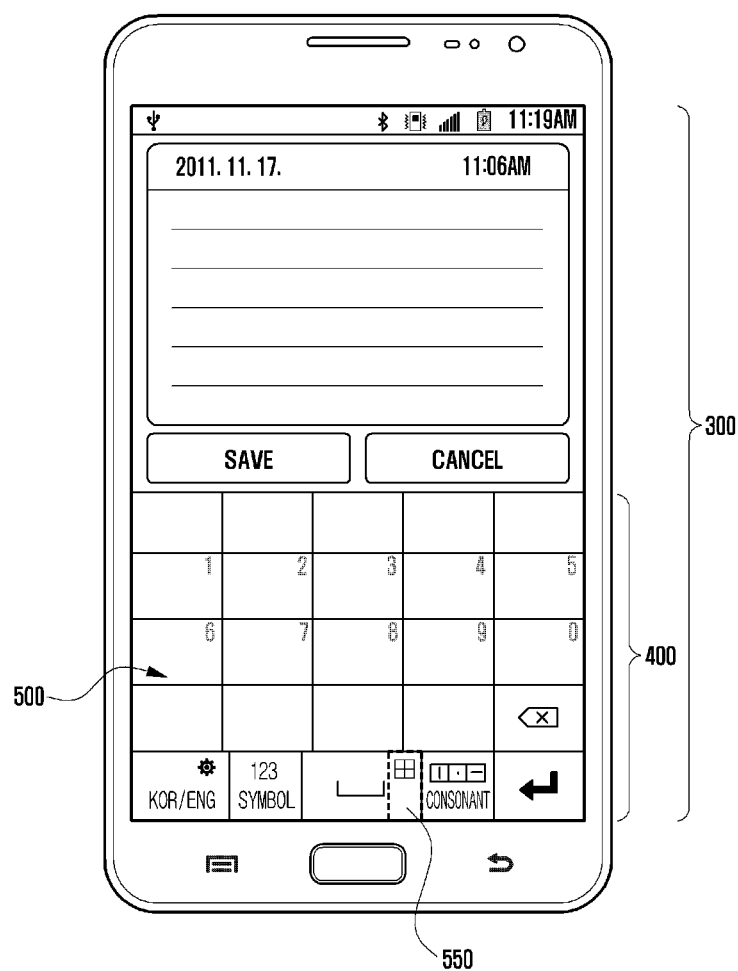

FIGS. 3 to 5 illustrate a screen interface for supporting an intelligent service in a user device according to an exemplary embodiment of the present invention.

Referring to FIGS. 3 to 5, the screen interface for supporting the intelligent service of the present invention may be divided into an execution screen region 300 where the execution screen of a certain application is provided, and a keypad region 400 where a keypad 500 for a command input for a character input and an intelligent service execution is provided on the execution screen region 300.

In exemplary embodiments of the present invention, the keypad region 400 for the keypad 500 may be variously arranged in the middle part and the upper part as well as the lower part of the execution screen region 300 depending on the user's setting. Further, the keypad 500 may be implemented in various forms according to the languages and key arrays supported in the user device as illustrated in FIGS. 3 to 5.

Further, the keypad 500 may include buttons 350, 450 and 550 (e.g., the smart conversion button and identifier button) for identifying the command corresponding to the user's input as well as buttons for a general character input. A certain button designated at the time of the manufacturing of the user device may be used as the smart conversion buttons 350, 450 and 550. Further, one or more buttons designated by the user among various buttons of the keypad 500 may be used as the smart conversion buttons 350, 450 and 550.

For example, as illustrated by the smart conversion button 350 of FIG. 3, the button may be implemented so as to be intuitively recognized as a smart conversion button for inputting identifiers for identifying the execution command of the intelligent service, where an icon (or a label such as ▧) is printed. Further, as in the smart conversion button 450 of FIG. 4, the button where a certain symbol (*) given to the keypad 500 is allocated may be implemented as a button for inputting an identifier. Further, as in the smart conversion button 550 of FIG. 5, a smart conversion button for an identifier input in the keypad 500 of the type where a certain symbol is not provided may be added.

That is, according to an exemplary embodiment of the present invention, the keypad 500 may use the certain button of the symbol region as a smart conversion button in the key array structure having a symbol region where symbols are arranged. Further, according to an exemplary embodiment of the present invention, in a general key array structure without a symbol region, the certain button of the keypad may be used as a smart conversion button or a dedicated button for smart conversion may be separately implemented.

Further, as in FIGS. 3 and 5, when dedicated smart conversion buttons 350 and 550 for an identifier input are provided in the keypad 500, the user may automatically input preset identifiers by selecting the smart conversion buttons 350 and 550. For example, in case the identifier is set to "*" or "[#]", if the user inputs smart conversion buttons 350 and 550, "*" or "[#]" may be automatically inputted in the text box.

Further, as illustrated in FIG. 4, when identifiers are inputted using general symbols of the keypad 500, the user may input identifiers by directly inputting the smart conversion button 450 as many times as the number corresponding to the preset identifier. For example, when the identifier is set as "**", if the user inputs the smart conversion button 450 twice, "*" may be inputted in the text box.

Further, the user may input preset identifiers without using smart conversion buttons 350, 450 and 550 as illustrated in FIGS. 3 to 5. For example, when the identifier is set to "[#]", the user may directly input "[#]" when sequentially inputting each character "[", "#", "]" which are set as identifiers using the keypad 500.

An exemplary operation of generating a command for an intelligent service using smart conversion buttons 350, 450 and 550 and a method of proving the intelligent service using the generated command as illustrated in FIGS. 3 to 5 will be described later. In particular, the smart conversion buttons 350 and 450 of FIGS. 3 and 4 are used below, and the case where the present identifiers is "**" will be illustrated. However, the present invention is not limited thereto, and thus the identifier for execution of the intelligent service may be inputted by an input of an identifier using the smart conversion button 550 of FIG. 5 and a direct input of an identifier using a character button allocated as the identifier. Further, the user may generate and input a separate identifier according to the user's setting.

FIGS. 6 to 9 illustrate a screen in which a command for an intelligent service in a user device may be inputted according to an exemplary embodiment of the present invention.

Figure 6:
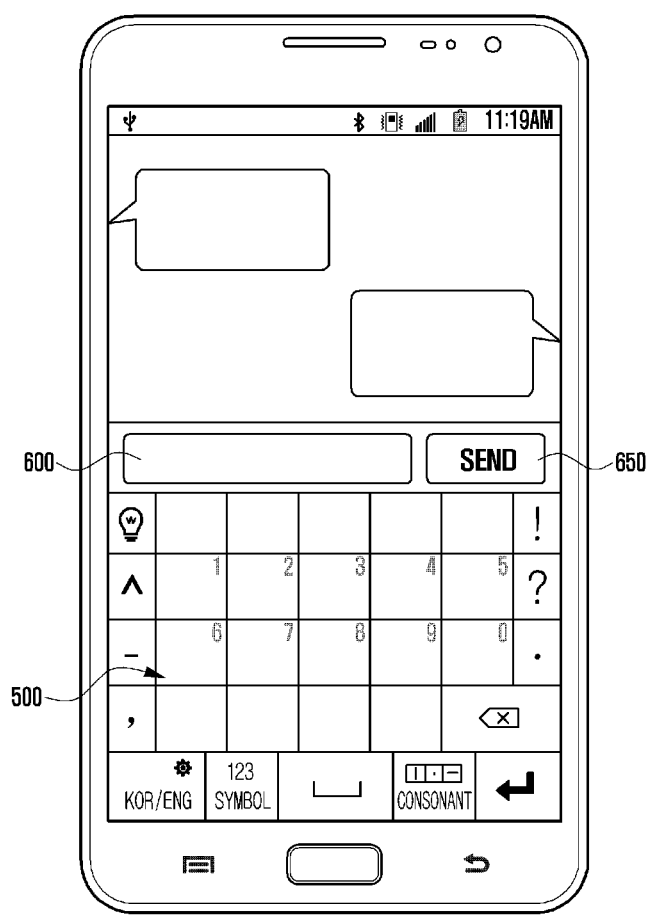
FIGS. 6 to 9 illustrate a screen in which a command for an intelligent service in a user device may be inputted according to an exemplary embodiment of the present invention.
Figure 7:
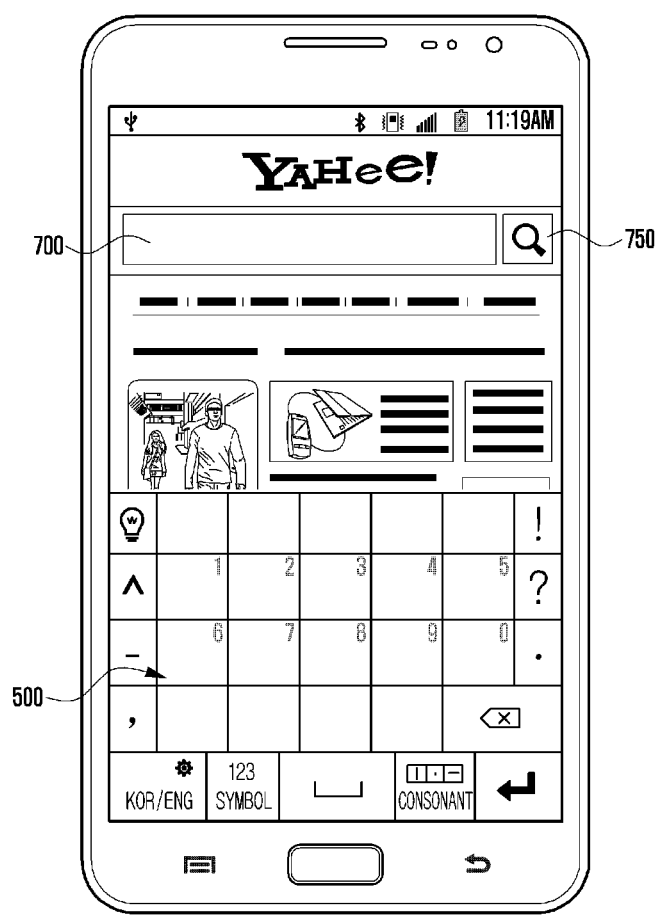
Figure 8:
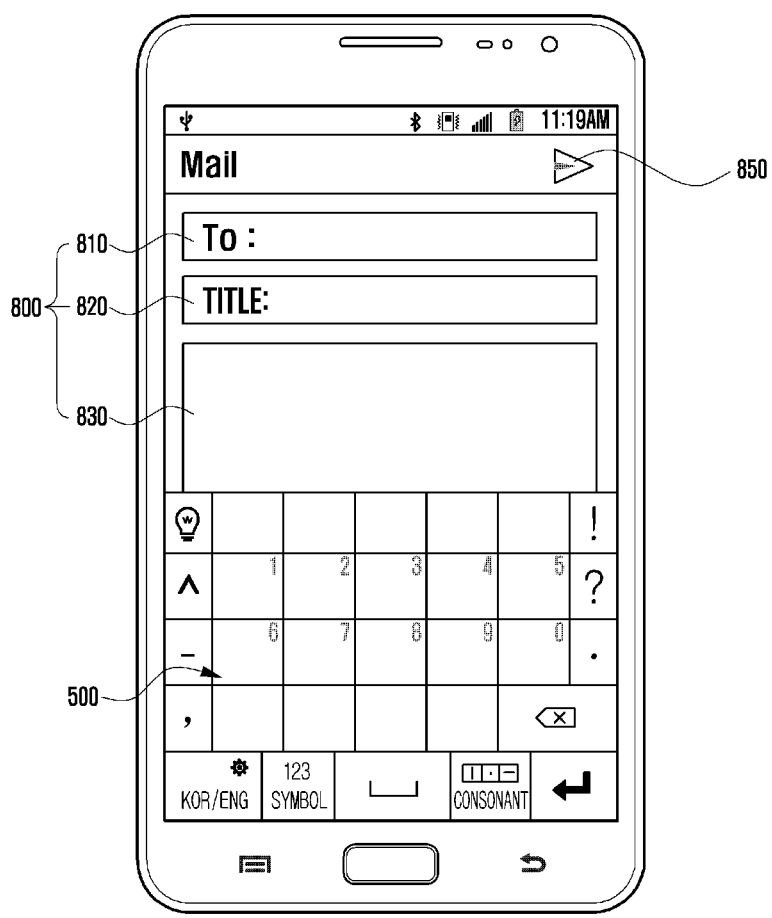
Figure 9:
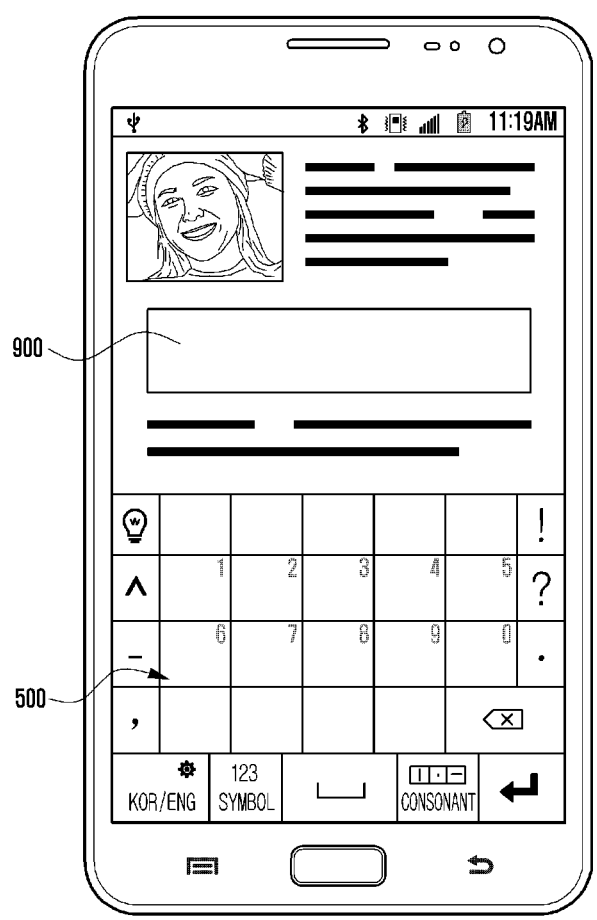

Referring to FIGS. 6 to 9, FIG. 6 illustrates an example of a screen (e.g., a memo execution screen) of a user device when a memo application is executed, FIG. 7 illustrates a screen (e.g., an Internet execution screen) of a user device when a search application is executed using Internet, FIG. 8 illustrates an example of a screen (e.g., an E-mail execution screen) of a user device when an e-mail execution screen is executed using Internet, and FIG. 9 illustrates an example of a screen (e.g., a content player execution screen) when a media content replay application (hereinafter, referred to as "media content player") is executed.

Referring to FIG. 6, the character (or string) inputted by the user using the keypad 500 may be shown on a text box 600 (e.g., a character input window). Further, in a state where characters corresponding to a user's input are displayed in the text box 600, if a transmission button 650 is inputted, the inputted characters may be inputted on the messenger execution screen (e.g., a message input window) and then be shown.

Further, the identifier and command for execution of an intelligent service may be shown on the text box according to the user's input using the keypad 500, and the result of the execution of the intelligent service by the inputted command may be shown on the text box 600. For example, the user may have an intention to input "hello" in another language (e.g., Japanese, Chinese, etc.). In such a case, the user may execute an intelligent service by the identifier and the command input (selection) in a state where "hello" is inputted in the text box 600 using the keypad 500.

The "hello" of the text box 600 may be automatically converted into another language corresponding to the user's input command. For example, when the user selects (i.e., inputs) Japanese translation by a command, "hello" is converted into "こんにちは", and when the user selects (i.e., inputs) Chinese translation, the "hello" is converted into "您好". Thereafter, the user may input and show translated "こんにちは (hajimemasite)" or "(Nin hao)" on the memo execution screen by selecting the transmission button 650 after language conversion by the intelligent service. As such, even if the user device's keypad is limited in a certain language, the translated result may be inputted in various languages desired by the user using only the given keypad.

As another example, the user may try to share movie information while chatting with another user. In such a case, the user may execute an intelligent service by an identifier and command input (selection) in the text box 600 using the keypad 500. For example, when the user inputs (i.e., selects) "Megabox", movie information about current shows (e.g., kinds of movies currently playing, play times, etc.) in "Megabox" may be shown. Thereafter, the user may share movie information with the other user by selecting the transmission button 650 after acquiring movie information by the intelligent service. As such, the user may be provided movie information in real time while maintaining the current chatting state without a complicated procedure such as a separate user device operation and function execution.

Referring to FIG. 7, a character (or string) inputted by the user using the keypad 500 may be shown on the text box 700 (e.g., a search window). Further, if a search button 750 is inputted in a state where a character corresponding to the user's input is displayed in the text box 700, the search result corresponding to the inputted character may be shown on the execution screen of Internet.

Further, the identifier and command for execution of the intelligent service is shown on the text box 700 according to the user's input using the keypad 500, and the result of the execution of the intelligent service by the inputted command may be shown on the text box 700. For example, the user may intend to perform a search based on a language other than English (e.g., French, German, Chinese, Japanese, etc.) for "I love you". In such a case, the user may perform an intelligent service by the identifier and command input (selection) in a state where "I love you" is inputted in the text box 700 using the keypad 500. Then, the "I love you" of the text box 700 may be automatically converted into another language corresponding to the user's input command. For example, when the user selects French translation as the command, "I love you" is converted into "Je t'aime", when the user selects German translation as the command, "I love you" is converted into "Ich liebe dich", when the user selects Chinese translation as the command, "I love you" is converted into "我爱你", and when the user selects Japanese translation as the command, "I love you" is converted into "愛してる". Thereafter, the user may perform a search corresponding to French "Je t'aime", German "Ich liebe dich", Chinese "我爱你" and Japanese "愛してる", not "I love you". As such, even if the keypad of the user device is limited to a certain language, the translated result may be inputted in various languages desired by the user using only a given keypad.

Referring to FIG. 8, the character (or string) inputted by the user using the keypad 500 may be shown on the text box 800 (e.g., a reception information input window 810, a title input window 820, and a content input window 830). Further, if the transmission button 850 is inputted in a state where the character corresponding to the user's input is displayed, an e-mail transmission may be performed based on the character inputted on the text box 800. That is, the title of the title input window 820 and the content of the content input window 830 may be transmitted to the other user corresponding to the reception information (e.g., the e-mail address) of the reception information input window 810.

Further, the identifier and command for execution of the intelligent service is shown on the text box 800 according to the user's input using the keypad 500, and the result on the execution on the intelligent service by the inputted command may be shown on the text box 800. For example, the user may try to search for reception information (e.g., e-mail address) of the other user for transmission of the e-mail in the reception information input window 810. In such a case, the user may execute an intelligent service that searches for the e-mail address corresponding to the contact information by the identifier and command input (i.e., selection) in a state where the other user's contact information (e.g., user's name, nickname, etc.) of the e-mail address intended to be searched for is inputted in the text box 800 (e.g., the reception information input window 810) using the keypad 500. For example, when "AAAe-mail address" is inputted (i.e., selected) by the user for a search of an e-mail address of "AAA" contact information, the user device searches for the e-mail address of AAA, and the searched e-mail address may be inputted in the text box 600 (e.g., reception information input window 810). That is, the "AAA" may be converted into the e-mail address type and be provided.

Further, the user may try to automatically input certain message content in the content input window 830. In such a case, the user may automatically generate and input a sentence by the text box 800 (e.g., the content input window 830) using the keypad 500. For example, when the user inputs (i.e., selects) "birthday celebration" to input a sense related with "birthday celebration", the user device may convert the input into "Thank you for your beautiful birth in this beautiful world, Happy Birthday" and be shown in the content input window 830. Further, when the user inputs "Kim Sowol azalea" to input a passage of a poem, the user device searches for and obtains "azalea" of "Kim Sowol", converts the input into "When you leave, if it upsets you to see me, I'll leave you without saying anything", and displays the content on the content input window 830.

Referring to FIG. 9, a method of supporting an intelligent service in an application (e.g., a content player, etc.) which does not require a separate character input is illustrated. That is, the text box 900 illustrated in FIG. 9 may be overlaid on the execution screen of the content player along with the keypad 500 in response to the activation of the user's keypad 500 in order to support the intelligent service in the application which does not require a character input as in the content player. The text box 900 may be provided in a transparent and semi-transparent form on the execution screen in consideration of the user's intuition.

An exemplary operation in which an intelligent service is provided while media is replayed through a content player will be described below with reference to FIG. 9. The user may activate the keypad 500 for a search of another media while viewing or listening to the data by the media replay. At this time, when the keypad 500 is activated, the text box 900 may be provided together in one region of the content player execution screen, or the text box 900 may be provided according to the user's character input after activation of the keypad 500. Further, the user may input the identifier and entire or partial names of the media intended to be searched using the keypad 500. For example, the user may input (i.e., select) "I love you" using the keypad 500. Then, "I love you" is sequentially shown on the text box 900 in response to the user's input, and thereafter the replay of the media currently being played is terminated, and the media searched for "I love you" may be replayed. That is, the user device may search for media including "I love you" in response to the identifier and command input, and may automatically replay the searched media. At this time, when a plurality of media are searched, a pop-up for receiving user's selection may be provided. As such, user may provide convenience in the search when trying to replay another media while replaying the media.

As another example, as illustrated in FIG. 9, when the user tries to determine the location (address) while the media is replayed, the user may input the identifier and command such as "location" using the keypad 500. Then, the user device may obtain the location of the user device and provide an address such as "Gyunggi-do, Suwon-si, Youngtong-gu, Metan-dong 2".

According to an exemplary embodiment of the present invention, various intelligent services may be simply and quickly provided through the keypad 500 in various execution screens of the user device. For example, according to an exemplary embodiment of the present invention, the user may execute various intelligent services according to the user's desire using the keypad 500 without stopping or conversion of the screen in real time, and may be provided the result. Further, while FIGS. 6 to 9 illustrate that different intelligent services are executed in different execution screens, the invention is not limited to the respective illustrated operations of FIGS. 6 to 9 but may be variously implemented according to the user's desire. Hereinafter, an exemplary operation method of the present invention will be described using the operation of performing an intelligent service in a memo execution screen of a memo application as a representative example. Again, this is merely an example and not to be construed as a limitation of the present invention.

FIGS. 10 to 16 illustrate an operation in which an intelligent service is performed according to an exemplary embodiment of the present invention.

Figure 10:
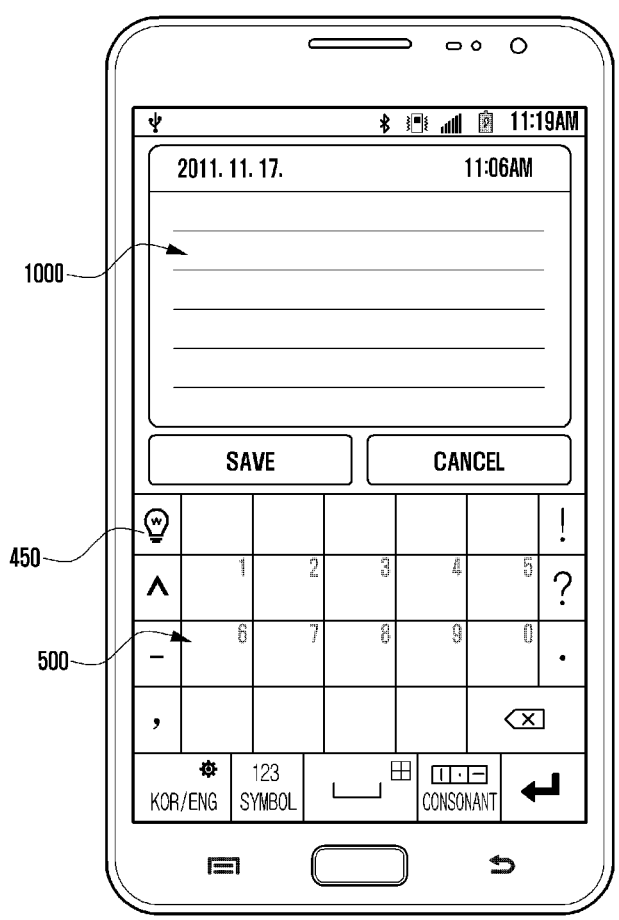
FIGS. 10 to 16 illustrate an operation in which an intelligent service is performed according to an exemplary embodiment of the present invention.

Referring to FIGS. 10 to 16, FIG. 10 illustrates a screen (e.g., a memo execution screen) of a user device when the user device executes a memo application. For example, if the execution command of the memo application occurs according to the control command inputted from the user, the memo application may be controlled so that a screen in a state in which an operation of waiting for a user's character input is being performed for memo writing may be provided. At this time, the keypad 500 may be provided by the user's activation request or may be shown together at the time of execution of the memo application. That is, as illustrated in FIG. 10, the memo execution screen may include an execution screen region where characters (i.e., a string) corresponding to the user's character input are displayed, and the keypad region for inputting the identifier and command for execution of the intelligent service. The memo execution screen of the present invention is not limited to the components illustrated in FIGS. 10 to 16, and may be implemented in various forms of UIs or GUIs.

Figure 11:
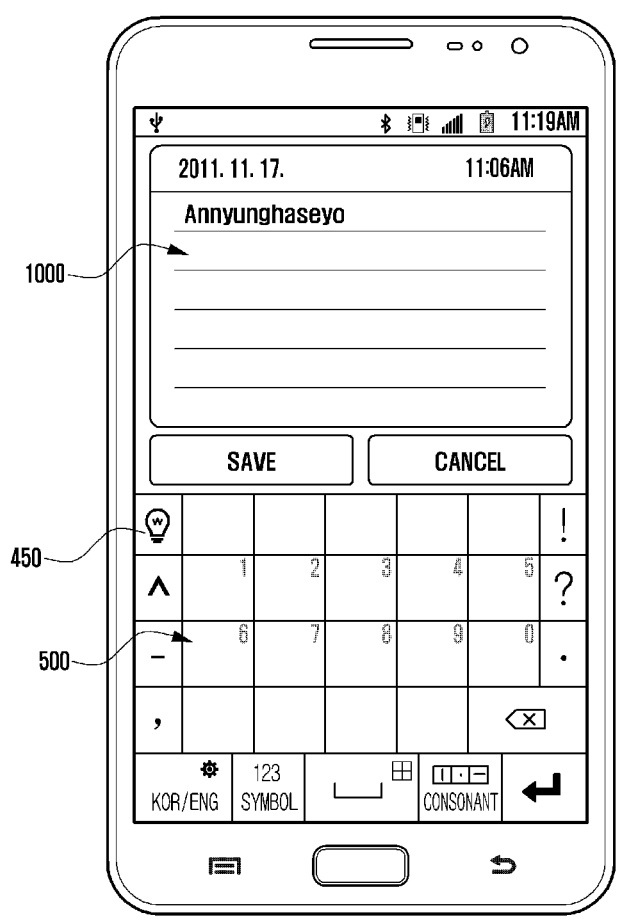

The user may input "Hello" according to the designated character input method using the keypad 500 in a state where the memo execution screen is displayed. Then, the user device may display the characters corresponding to the user's input on the memo executions screen (e.g., the text box (memo input window)) in response to the character input using the keypad 500 of the user as illustrated in FIG. 11. That is, FIG. 11 illustrates a screen example in a state where "hello" is displayed on the memo execution screen of user device according to the user's memo input.

Figure 12:
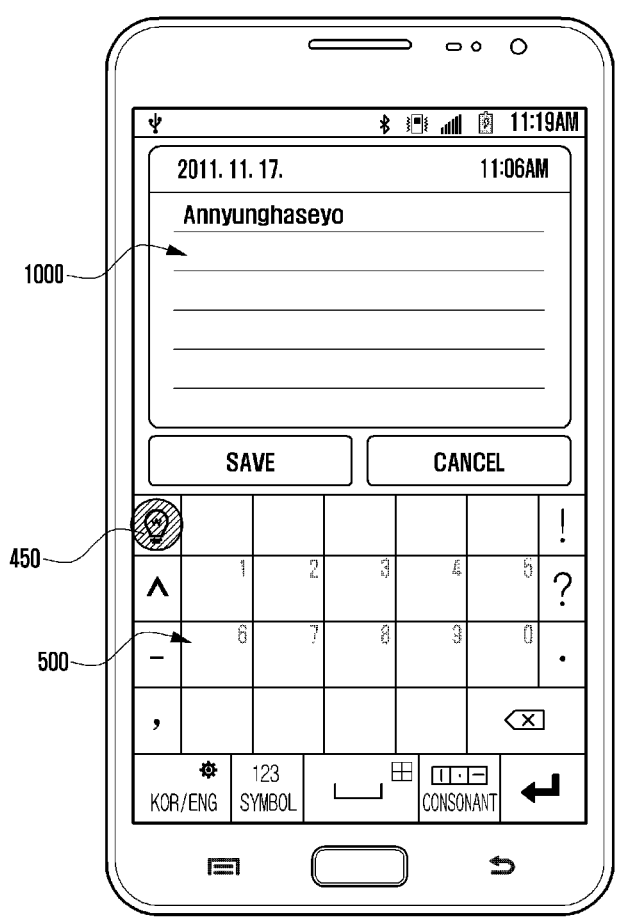

In the screen where "hello" is displayed as in FIG. 11, the user may input the identifier for command identification according to the intelligent service as illustrated in FIG. 12. For example, the user may select (i.e., touch) the smart conversion button 450 for generating and inputting an identifier for identifying commands according to the intelligent service in the keypad 500 as illustrated in FIG. 12. Further, the user may directly input the preset identifier instead of selecting the smart conversion button 450 in FIG. 12. It is assumed that the identifier defined by the smart conversion button 450 is "**" in FIG. 12.

Figure 13:
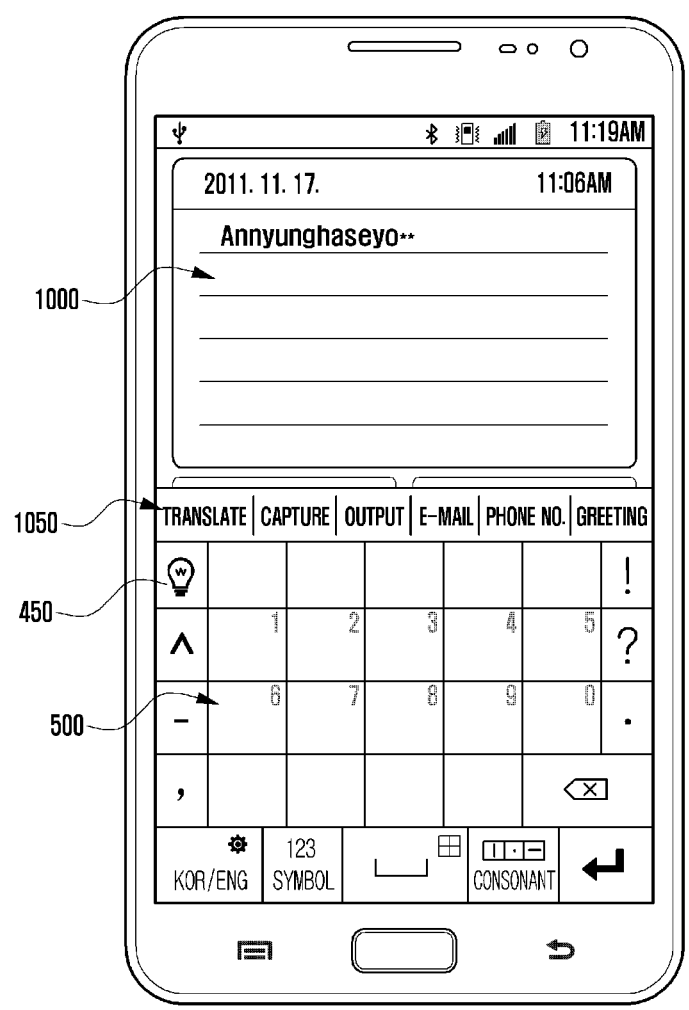

If the smart conversion button 450 is inputted, the user device displays a screen as in FIG. 13. That is, the screen of the user device shown in FIG. 12 is converted into the screen shown in FIG. 13 according to the selection of the smart conversion button 450 of the user.

As illustrated in FIG. 13, the predefined identifier "" may be added to the "hello" inputted before the memo execution screen. Here, the user device may activate the command candidate group region 1050 in one of the regions of the keypad 500 and the memo execution screen 1000 and provide the command candidate through the command candidate region 1050 when the identifier "" is inputted through the smart conversion button 450 or direct input from the user. That is, the command candidate group region 1050 may be added to the configuration of the execution screen region and the keypad region as in FIG. 12 as shown in FIG. 13. The command candidate group region 1050 may be fixed on the upper side of the keypad 500, or when the identifier according to the execution of the intelligent service is inputted, the command candidate group region 1050 may be activated and shown on the upper side of the keypad 500 as shown in FIG. 13. Further, the command candidate group region 1050 may be implemented separately from the UI of the keypad 500, or may be implemented integrally with the UI of the keypad 500.

Further, the candidate of all predefined commands corresponding to the input of the identifier and command or the candidate of command including characters of the command corresponding to the user's input may be provided as the command candidate group provided to the command candidate group region 1050.

For example, in the case of FIG. 13, all commands predefined in the user device may be shown in the command group region 1050 according to the state where only identifier "" is inputted. All commands defined in the user device as illustrated in the examples considered in Tables 1 to 3 such as translation, translated region, Japanese translation, Chinese translation, capture, output, e-mail, phone number, greeting, weather, weather [city name], local weather, biorhythm, etc. may be provided as the candidate of the command displayed in the command candidate group region 1050. Hence, the command candidate region 1050** may support navigation of other commands which are not provided in the current screen by the right and left scroll (or slide) according to the user's input.

Figure 14:
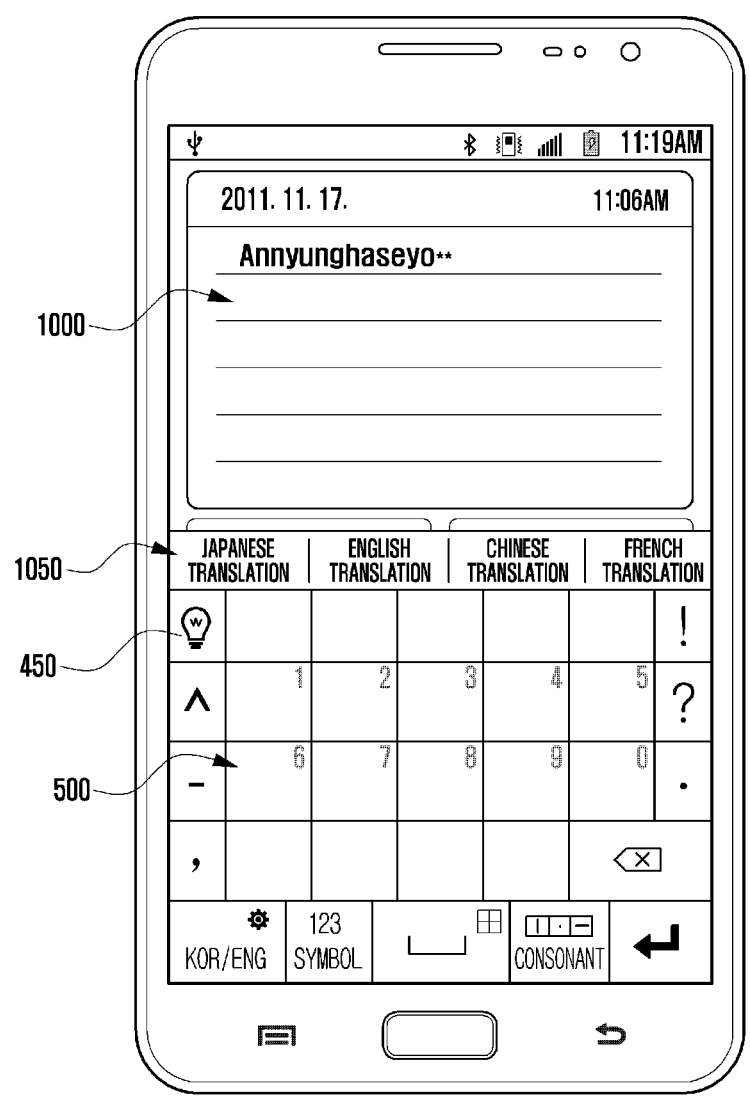

As another example, as illustrated in FIG. 14, when part of the command of the intelligent service intended to be executed by the user is inputted behind identifier "", the user device may extract only the command including the part of the command and be shown on the command candidate region 1050**. For example, commands including translated English, translated Japanese, translated Chinese, translated French, phone number, etc. may be provided.

Figure 15:
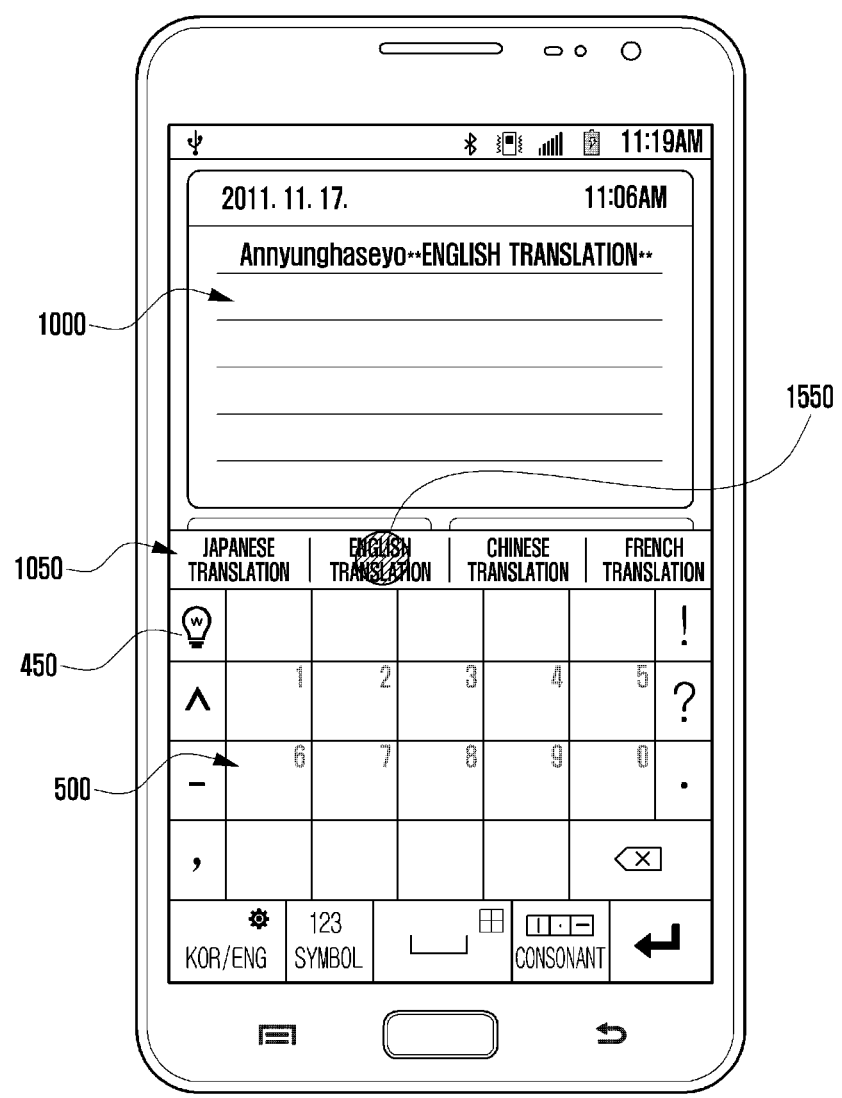

As another example, as illustrated in FIGS. 14 and 15, when part of the command (e.g., "Eng") of the intelligent service or the entire command (e.g., "English translation") of the intelligent service intended to be executed by the user after identifier "" is inputted, the user device may extract the command including "Eng" or the expression "English translation" may be extracted. At this time, the command according to the user's input may not be extracted. That is, the command inputted by user may be a command which does not exist. In such a case, the user device may provide the command candidate region 1050** as an empty region depending on the command input which does not exist. Further, the guide for additional registration of the command inputted by the user, and the related screen interface may be provided, and the additional registration of the inputted command may be provided depending on the user's selection.

Further, in the examples of FIGS. 13 and 14, the command candidates may be divided according to the type of the executed application, and may be implemented according to the user's setting. For example, the command candidate group according to the intelligent service may be set as in "recommendation by applications" or as in "recommendation of all commands" through the option setting, etc. In the case of the "recommendation by applications", the command corresponding to the application currently being executed may be provided as the candidate, and in the case of the "recommendation of all commands", all commands provided in the user device may be provided as the candidate regardless of the applications currently being executed.

Further, the user may select (e.g., touch) or input a certain command for performing an intelligent service in a state where the command candidate group region 1050 is displayed as in FIG. 13 or FIG. 14. For example, the user may complete "AnnyunghaseyoEnglish translation" by adding "English translation" through the keypad 500 in the state of "Annyunghaseyo", or may select (e.g., touch) the region 1550 where the "English translation" command has been allocated in the command candidate region 1050 as illustrated in FIG. 15.

At this time, the user device may determine execution of the intelligent service at the time point where the "AnnyunghaseyoEnglish translation" is completed by the identifier "" after "AnnyunghaseyoEnglish translation" is inputted (i.e., the command is inputted after the first identifier for the start of the command, and a second identifier for termination of the command is inputted after the command) as illustrated in FIGS. 14 and 15.

Further, when the command of "English translation" is selected (e.g., touched) in a state where "Annyunghaseyo" or "AnnyunghaseyoEng" is inputted, the user device may automatically complete "AnnyunghaseyoEnglish translation" and determine execution of the intelligent service as illustrated in FIGS. 13 to 15. That is, when a certain command is selected in the command candidate group region 1050, a second identifier for termination of the command after the command may be automatically inputted. In an exemplary implementation, when the user selects a command in the command candidate group region 1050, the state where the selected command and the termination identifier are inputted is temporarily displayed for a certain time (e.g., some seconds) in consideration of the convenience of explanation and user's intuition, but the operation screen of FIG. 15 may be omitted.

Further, when the command input is completed by the user according to an example considered in FIG. 15, the user device may analyze the inputted command and execute the corresponding intelligent service so as to display the result screen. That is, the screen of the user device shown on FIG. 15 may be converted into FIG. 16 according to the execution of the intelligent service.

Figure 16:
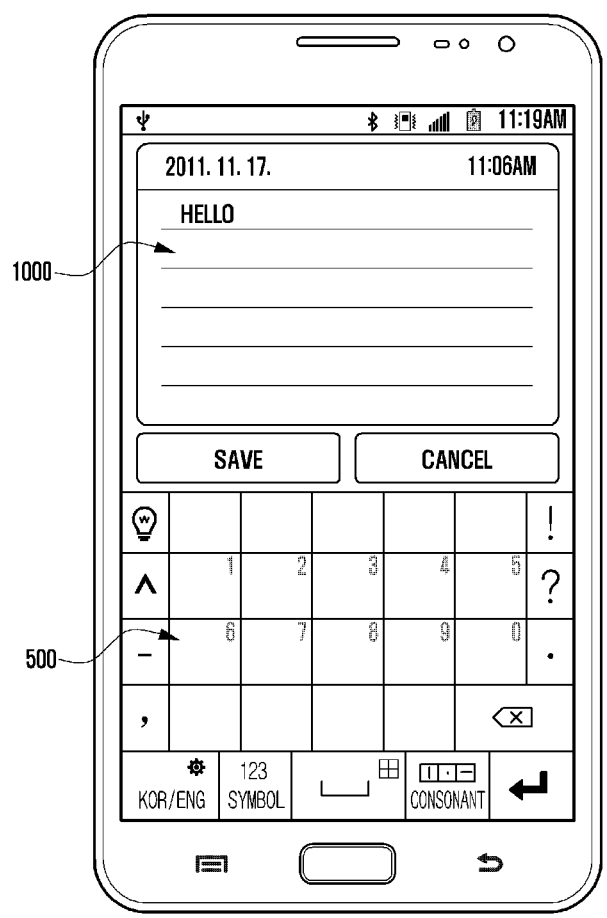

If the execution of the intelligent service is determined according to "AnnyunghaseyoEnglish translation", the user device may analyze the command between the start identifier and the termination identifier. At this time, the existence of the parameter (e.g., "Annyunghaseyo") inputted before the command may also be determined. Further, if the analyzed command corresponds to the "English translation", the user device converts the inputted "Annyunghaseyo" inputted in the text box 1000 (i.e., memo execution screen) into "Hello" and displays the "Hello" as illustrated in FIG. 16. That is, the screen of the user device where "Annyunghaseyo" of FIG. 12 is displayed is converted into the screen where "Hello" is displayed as illustrated in FIGS. 13 to 15.

Further, FIG. 16 shows that, in the result screen where the parameter (e.g., "Annyunghaseyo" inputted before the start identifier) has been processed with the intelligent service according to the user's input (i.e., selection) command, the parameter is omitted, and the result (e.g., "Hello") is provided for the parameter. However, the present invention is not limited thereto, and may be implemented in various ways. Such an example will be described with reference to FIG. 17.

Further, the illustration and description in FIGS. 10 to 16 have been omitted, but according to an exemplary embodiment of the present invention, at least one certain character (or command) according to the user's definition may always be provided in the command candidate region as considered above. For example, the user's phone number may be displayed in the last part of the command candidate group region.

Further, if the pre-registered phone number is selected from the command candidate region, the intelligent service corresponding to the phone number may be performed to show the related result. Further, when there is no intelligent service corresponding to the pre-registered phone number in the command candidate group region, the related screen interface for allowing user to input (i.e., register) the intelligent service to be performed when the phone number is selected.

Figure 17:
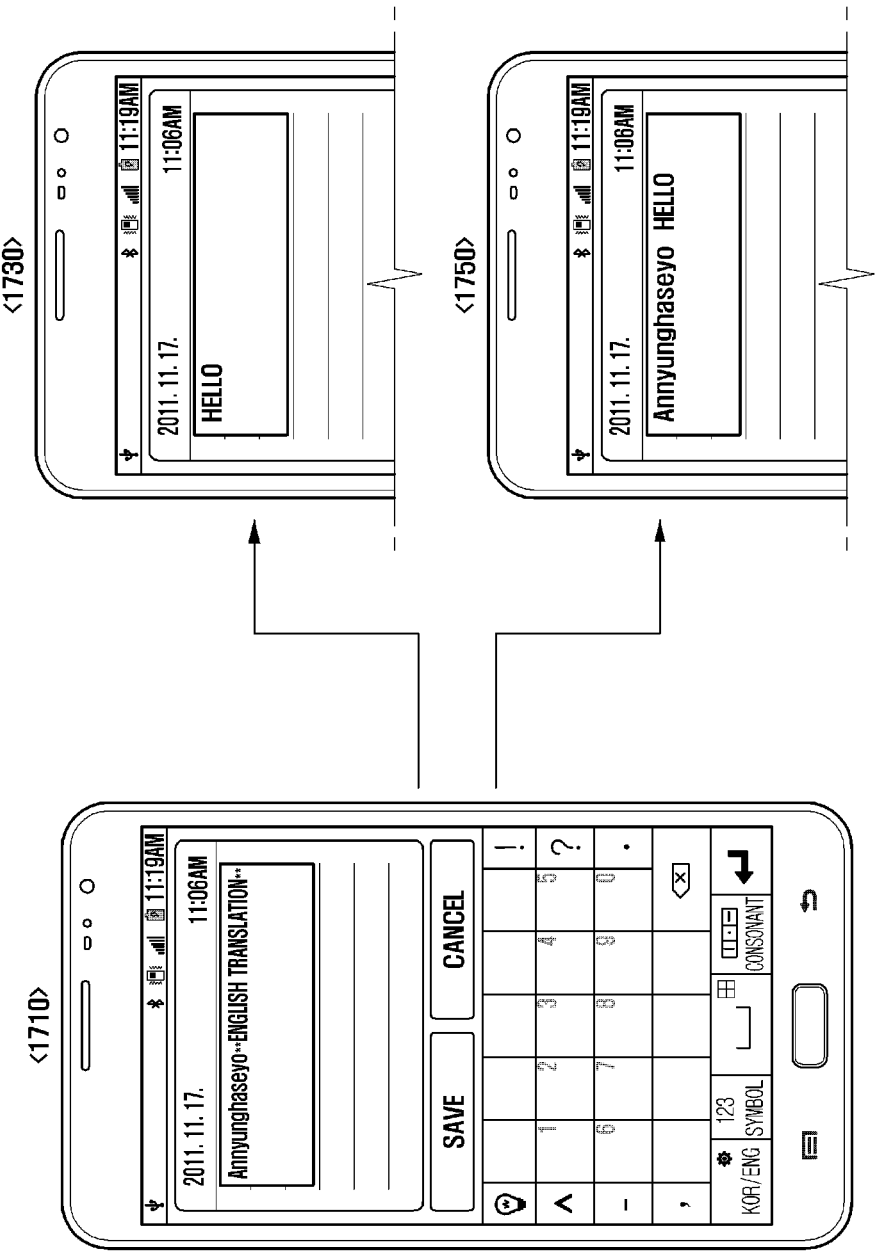
FIG. 17 illustrates a result screen according to performance of an intelligent service in a user device according to an exemplary embodiment of the present invention.
Figure 18:
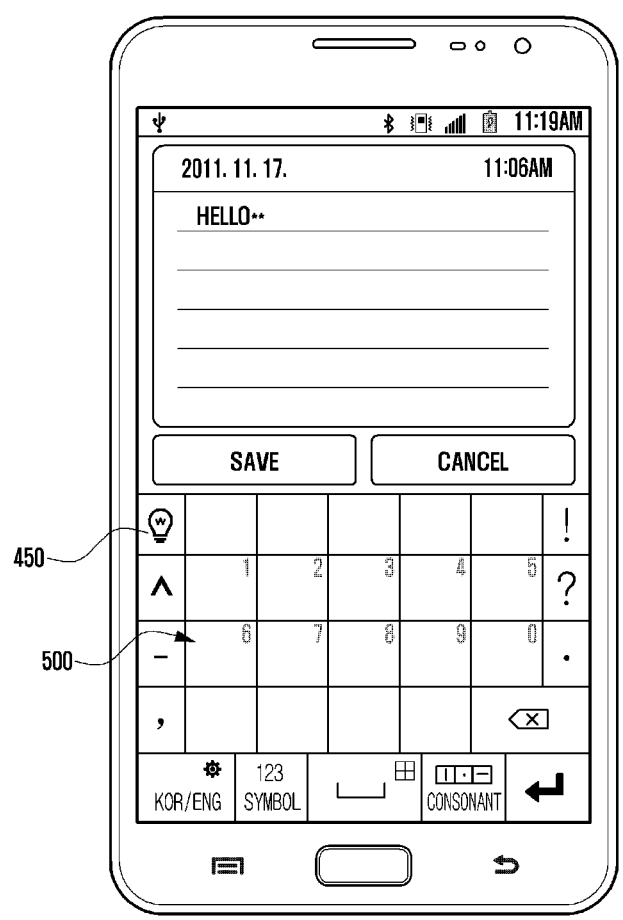
FIGS. 18 to 21 illustrate an operation in which an intelligent service is executed using a keypad in a user device according to an exemplary embodiment of the present invention.

FIG. 17 illustrates a result screen according to performance of an intelligent service in a user device according to an exemplary embodiment of the present invention.

Referring to FIG. 17, when the intelligent service is processed (e.g., translated) according to the "AnnyunghaseyoEnglish Translation" of reference numeral 1710, the screen of the user device where "Annyunghaseyo" of reference numeral 1710 is displayed may provide only the result or may provide the parameter and the result together according to the user's setting or the performed intelligent service. That is, the screen of the user device as illustrated in reference numeral 1710 may be converted into the screen of reference numeral 1730 where only the result of processing the parameter, or may be converted into the screen of reference numeral 1750 where the parameter and the result are displayed together.

As illustrated in reference numeral 1730, only "Hello", which is the translation of parameter "Annyunghaseyo", may be displayed. Further, as illustrated in reference numeral 1750, the parameter "Annyunghaseyo" is transmitted and the English translation "Hello" may be displayed together as "Annyunghaseyo Hello". Here, when the parameter and the intelligent service process result are provided together, the display method may be implemented in various manners. For example, "Annyunghaseyo Hello", "Annyunghaseyo (Hello)", "Annyunghaseyo: Hello" may be displayed. Such a display method may be variously implemented according to the user's setting and the type of the performed intelligent service.

FIGS. 18 to 21 illustrate an operation in which an intelligent service is executed using a keypad in a user device according to an exemplary embodiment of the present invention.

FIGS. 18 to 21 illustrate an operation where the user directly inputs a command (e.g., "Japanese translation") of an intelligent service of translating the parameter into Japanese regardless of the command candidate group in a state where a memo application is executed and the parameter like "Hello" is provided in the memo execution screen according to the memo application.

Referring to FIGS. 18 to 21, FIG. 18 illustrates a screen example of the user device where "Hello" is inputted according to the user's character input in the memo execution screen according to the memo application, and the start identifier "" is inputted after the "Hello" parameter for the input of a new command. For example, a screen in a state "Hello" is inputted may be provided as the user activates the keypad 500 in the memo execution screen and "Hello" is inputted using the keypad 500 and then the start identifier "" is inputted. Here, the start identifier "" may be directly inputted by user or may be inputted by selection of the smart conversion button 450.

Figure 19:
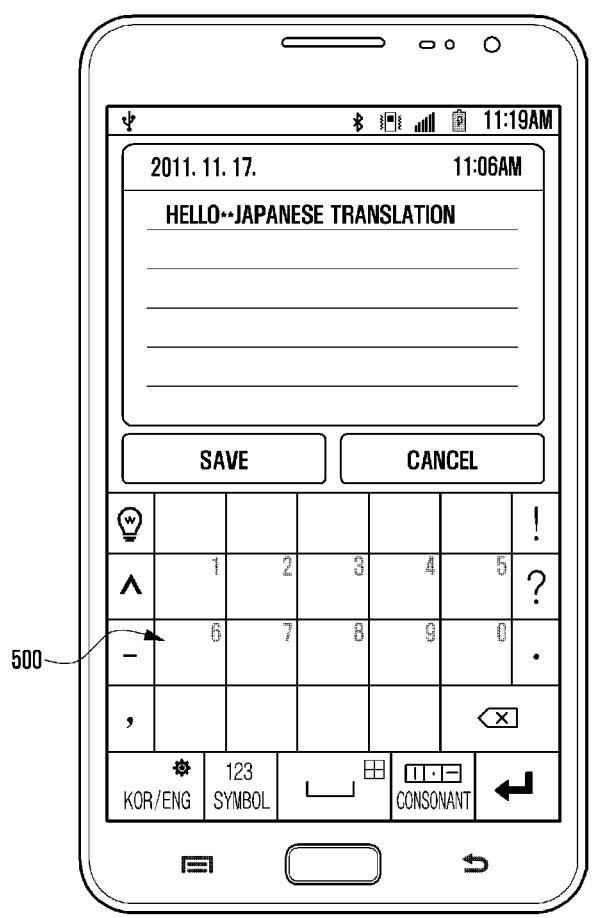
Figure 20:
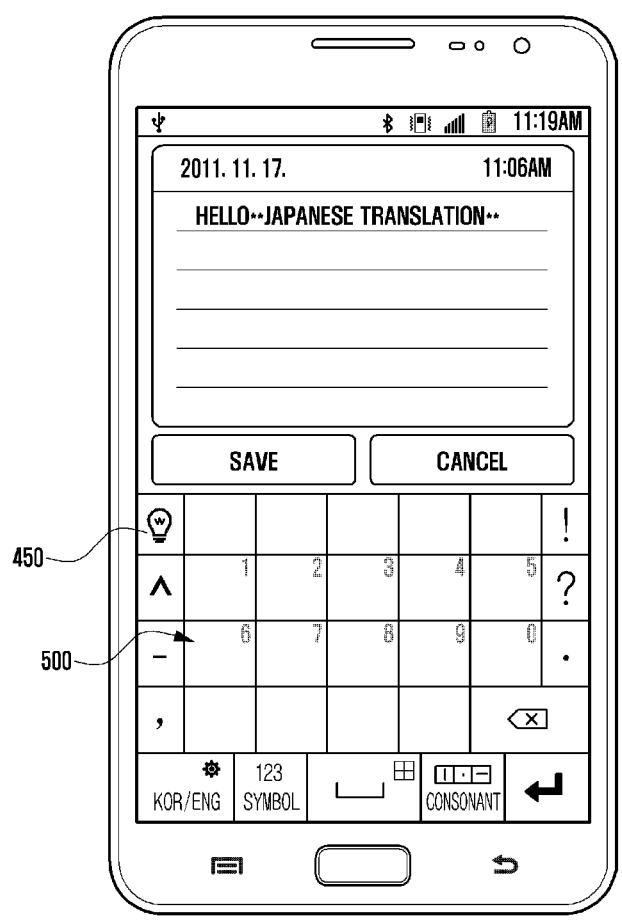
Figure 21:
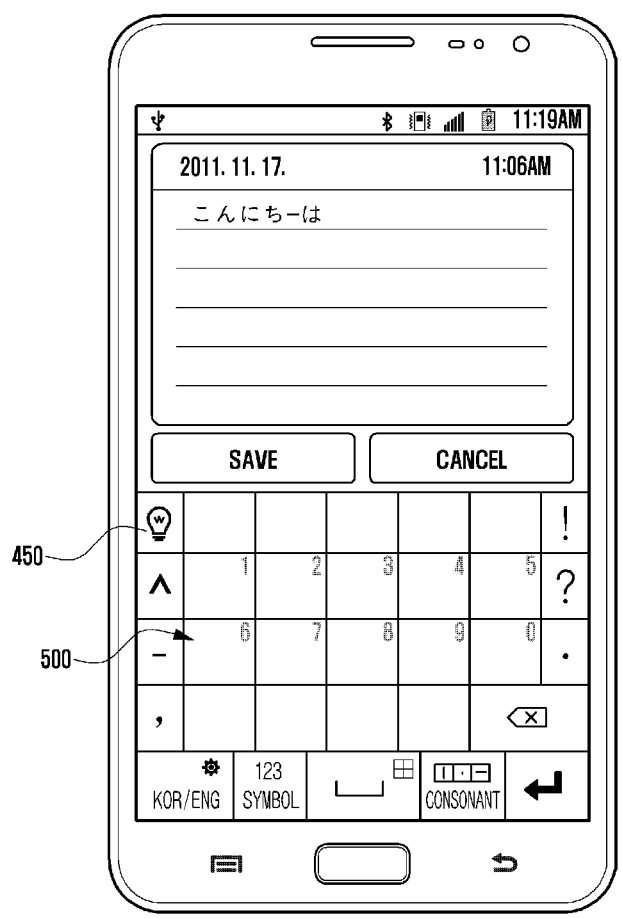

In a state where "Hello" is displayed, the user may input a command for execution as an intelligent service using the keypad 500 as illustrated in FIG. 19. For example, the user may input a command such as "Japanese translation" in a character input scheme that is supported by the keypad 500 for Japanese translation of the "Hello". Thereafter, after inputting the desired command "Japanese translation", the user may input the termination identifier "" after the command as illustrated in FIG. 20 in order to complete the command input and execute the intelligent service (i.e., Japanese translation) according to the input. Here, the identifier "**" may be directly inputted by the user or may be inputted by the selection of the smart conversion button 450.

Then, if the command input is completed in a state where the parameter "Hello" is provided, the user device may execute the intelligent service according to the inputted command and obtain and display the result. That is, the user device performs Japanese translation according to "Japanese translation", which is the user's input command, for "Hello", and the result "こんにちは" may be displayed. That is, the screen of the user device shown in FIG. 20 is converted into the screen of FIG. 21 according to the performance of the intelligent service.

Further, after executing the intelligent service (e.g., Japanese translation), the user may intend to execute the same intelligent service as illustrated in FIGS. 18 to 21. For example, after performing Japanese translation for "Hello", "Saranghe" may be intended to be translated into Japanese in the memo application or another application (e.g., chatting application). In this case, the user may input "Saranghe" using the keypad 500 in the corresponding execution screen, and may then perform Japanese translation by the identifier and command input to the procedure as illustrated in FIGS. 18 to 21. Further, prompt execution may be supported using the smart conversion button 450 when intended to execute the intelligent service that is the same as the previously performed intelligent service which has been previously performed to simplify the execution for the user's convenience and intelligence service. For example, the user may input the smart conversion button 450 for more than a preset period of time (e.g., a long press) after inputting "Saranghe" using the keypad 500 in the execution screen. Then, the user device may perform Japanese translation for "Saranghe" and display the execution result "愛してる" according to the previously executed intelligent service. That is, if user has previously used "Japanese translation" and the user pushes the smart conversion button 450 for a long time, the "Japanese translation" may be promptly performed.

Figure 22:
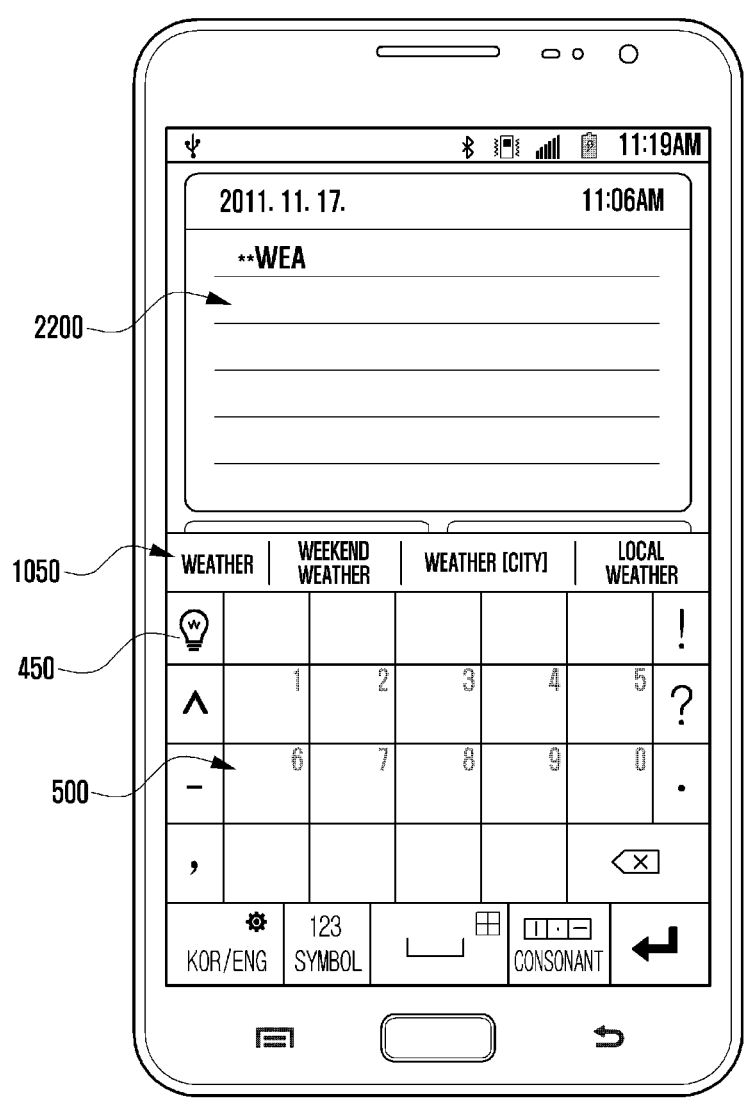
FIGS. 22 and 23 illustrate an operation in which an intelligent service is executed using a keypad in a user device according to an exemplary embodiment of the present invention.
Figure 23:
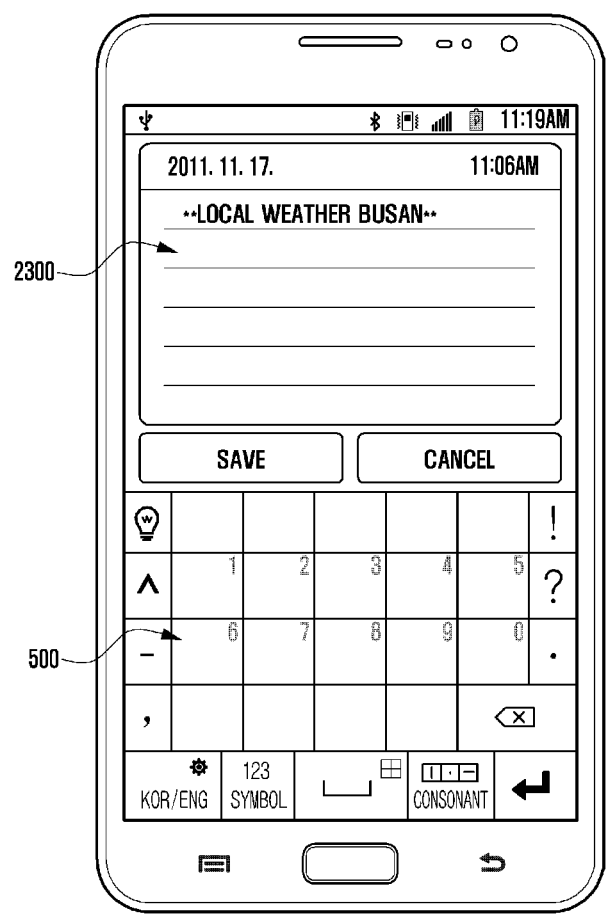

FIGS. 22 and 23 illustrate an operation in which an intelligent service is executed using a keypad in a user device according to an exemplary embodiment of the present invention.

Referring to FIGS. 22 and 23, FIGS. 22 and 23 schematically illustrate another example where an intelligent service of the present invention is provided, and illustrate a screen example where the intelligent service for weather information is provided by the identifier and command without an input of a separate parameter in FIGS. 22 and 23.

As illustrated in FIG. 22, the user may input an identifier "" by the smart conversion button 450 or a direct input to the text box 2200 using the keypad 500 in order to obtain weather information. Further, the user may complete the character such as "wea" by inputting "wea", which is part of the command of the intelligent service, after the identifier "**". Then, the user device may extract the command including "wea", and display "wea" in the command candidate group region 450. For example, weather, weekend weather, weather [city], local weather, etc. may be provided. Further, the user may execute an intelligent service for obtaining weather information by selecting a command desired in the command candidate group region 450. That is, if the user selects (i.e., touches) a certain command in the command candidate region 450, the result screen for the selected command may be outputted. For example, when the user selects "weather" command, the weather information of the area corresponding to the current location of the user device may be outputted. Further, when the user selects "weekend weather" command, the weather information of the weekend may be outputted. Further, when the user selects "local weather" command, the weather information for each area may be outputted.

Further, FIG. 22 illustrates an example when "command+ [variable factor]" is implemented unlike a general command in the case of "weather [city]" command. That is, the example may be a form for supporting the input of a city name which is a variable factor. Hence, when user selects "weather [city]", a screen in a state for an input of a variable factor with "weather_" is provided in the text box 2200, and the user may input the variable factor (e.g., the city name) and execute the intelligent service by the input of the termination identifier using the keypad 500. For example, when the user selects "weather [city]" command and then "weather_" is provided in the text box, the user may input "Busan" and termination identifier "" using the keypad 500. That is, the finally inputted form may have the form of "weather Busan**". In such a case, the user may recognize the "weather" command and the variable factor "Busan" for the "weather", and provide weather information of Busan. The input using such a variable factor may be variously implemented according to the various commands. For example, user may execute an intelligent service including the command and variable factor such as "weather Busan", "local weather Busan" or "todays' weather Busan". Such an example is shown in FIG. 23.

As illustrated in FIG. 23, the user may execute an intelligent service including the command and variable factor such as "local weather Busan". For example, the user may execute an intelligent service including the command and identifier as in "local weather Busan" in the text box 2300 through a direct input using the keypad 500 or a selective input using the smart conversion button of the keypad 500. Then, the user device may output weather information of Busan such as "Busan sunny, brief shower" by parsing variable factor "Busan" in response thereto and by performance (e.g., search of Busan weather, etc.) based on variable factor "Busan" when executing the "local weather" of the command. At this time, the command and the variable identifier between the identifiers (i.e., start identifier and termination identifier) may be divided by spacing words as in "Local weather Busan" or may be divided by using a certain symbol (e.g., variable factor identifier) as in "Local weather & Busan". That is, the user may determine that a variable factor is included when spacing of words or a certain symbol (e.g., &) is found in characters corresponding to the command between identifiers according to the setting method. Here, in exemplary embodiments of the present invention, characters inputted after spacing of words after the command may be set as a variable factor, or characters inputted after the variable factor identifier may be set as a variable factor. That is, the input may be made in the order of "command+variable factor". However, the present invention is not limited thereto, and the order of "variable factor+command" may also be possible.

As another example, the user may perform an intelligent service including a command (e.g., contact number) and a variable factor (e.g., Chulsoo) as in "contact number Chulsoo)". For example, the user may perform an intelligent service including the command and the variable factor as in "contact number Chulsoo" in the text box 2300 through a direct input using the keypad 500 or through a selective input using the smart conversion button of the keypad 500. Then, the user device may parse variable factor "Chulsoo" in response thereto, and may execute the command "contact number" on the basis of the variable factor "Chulsoo" (e.g., a search of Chulsoo contact number, etc.) and output the contact number information of Chulsoo as in "010-1234-5678, chulsoo@samsung.com".

Here, according to an exemplary embodiment of the present invention, in the case of an intelligent service for a contact number search as in an exemplary embodiment of the contact number of Chulsoo, "parametercommand" form may be possible. For example, after "Chulsoo" is inputted as the parameter, "contact number" is inputted as the command between identifiers, and the intelligent service may be executed in the form of "Chulsoocontact number". As such, the result information "010-1234-5678, chulsoo@samsung.com" may be provided.

Figure 24:
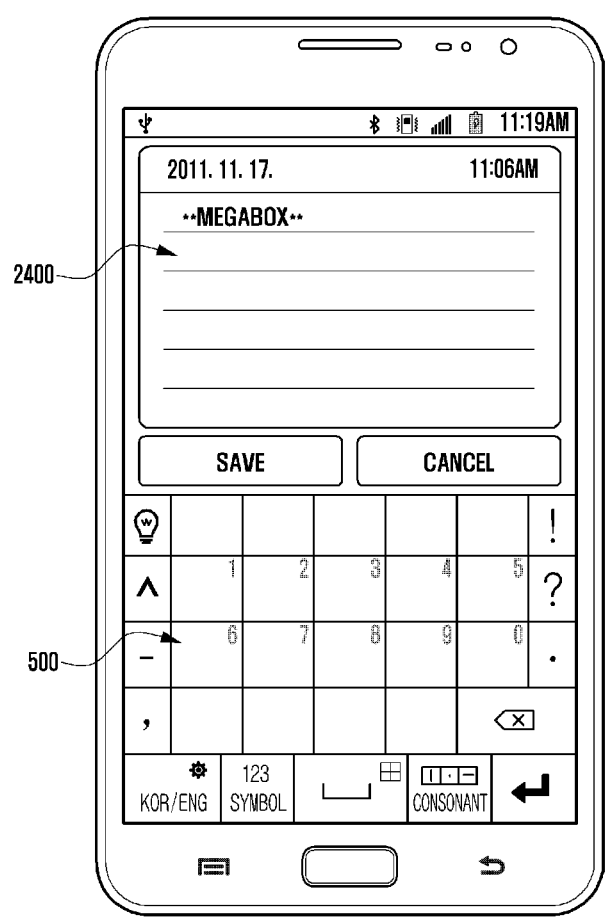
FIGS. 24 and 25 illustrate an operation in which an intelligent service is executed using a keypad in a user device according to an exemplary embodiment of the present invention.
Figure 25:
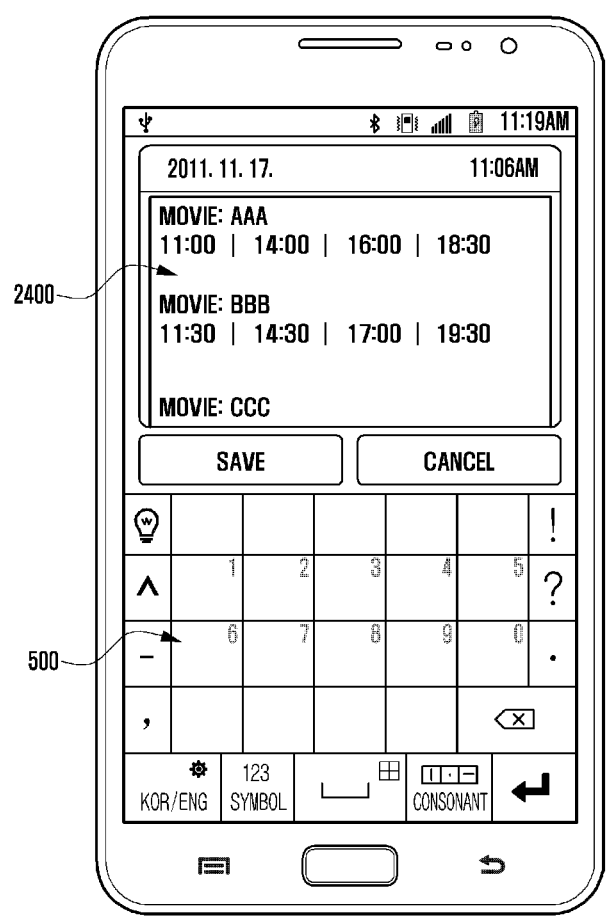

FIGS. 24 and 25 illustrate an operation in which an intelligent service is executed using a keypad in a user device according to an exemplary embodiment of the present invention.

Referring to FIGS. 24 and 25, FIGS. 24 and 25 schematically illustrate another example where an intelligent service of the present invention is provided, and FIGS. 24 and 25 particularly illustrate a screen example when an intelligent service for movie information is provided by the identifier and command without a separate parameter input.

As illustrated in FIG. 24, in order to obtain movie information being played in a certain theater, if identifier "Megabox" is inputted by a direct input or a smart conversion button 450 in the text box using the keypad 500, the result screen for the "Megabox" may be outputted. That is, the user inputs a certain theater name (e.g., Megabox), and the user device may determine that the service is an intelligent service for obtaining information on movies being played in the theater, and obtain and output information on the movies being played in the theater. For example, as illustrated in FIG. 25, user device may output movie information (e.g., names of movies being played, and play time, etc.) on movies being played in the requested theater on the text box 2400. Here, the movie information may be obtained through a search of the database within the user device, or may be obtained through a search of a website or an open API.

Figure 26:
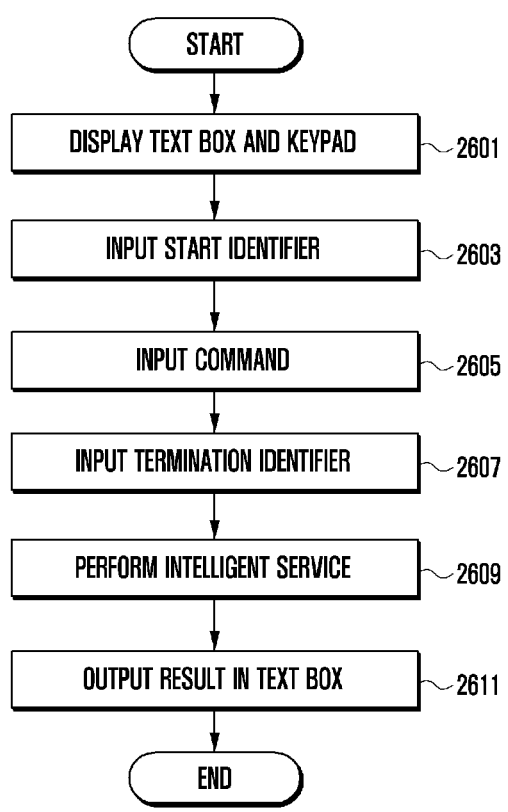
FIG. 26 is a flowchart illustrating an operation for providing an intelligent service in a user device according to an exemplary embodiment of the present invention.

FIG. 26 is a flowchart illustrating an operation for providing an intelligent service in a user device according to an exemplary embodiment of the present invention.

Referring to FIG. 26, the controller 170 controls the text box and the keypad display on the execution screen of the application in response to the user's request in step 2601. For example, the execution command of a certain application (e.g., a memo application, a chatting application, an e-mail application, etc.) occurs according to the control command inputted from user, the controller 170 may control the execution of the application and the display of the execution screen according to the execution of the application. Further, the controller 170 may activate and show the keypad on the execution screen of the application according to the user's request at the time of the execution of the application or after the execution of the application. At this time, the execution screen of the application may include a text box corresponding to the application. Such an example is shown in FIG. 10 as considered above.

The controller 170 controls the start identifier to be inputted and displayed in the text box in response to the input using the user's keypad in step 2603. For example, when the smart conversion button of the keypad is selected while waiting for the user's input using the keypad, the controller 170 may input the start identifier. Further, when the character (e.g., "\*") corresponding to the identifier is selected using the character button of the keypad, the controller 170 may input the start identifier. Such an example is shown on FIG. 13.

The controller 170 controls the command to be inputted and displayed behind the identifier (e.g., "\*") inputted in the text box according to the input using the user's keypad in step 2605. For example, after inputting the start identifier, when the character button of the keypad is selected while waiting for the user's input, the controller 170 may control the character corresponding to the user's input after the start identifier to be inputted and be displayed. Such an example is shown in FIGS. 14 and 15.

The controller 170 controls the termination identifier behind the command corresponding to the input using the user's keypad to be inputted and displayed in step 2607. Here, the termination identifier may be inputted by the smart conversion button selection or the character selection corresponding to the user's identifier. Further, the termination identifier may be automatically inputted and shown when a certain command is selected in the command candidate group region. Further, the controller 170 may control to obtain the result according to the performance of the intelligent service, and to output the obtained result in the text box in step 2611. The example is shown in FIGS. 15 and 16.

For example, if the termination identifier is inputted, the controller 170 determines the performance of the intelligent service, and controls the performance of the intelligent service corresponding to the command in step 2609. For example, if the input for the execution of the user's intelligent service using the keypad is completed (e.g., the state where the start identifier, command and termination identifier are all inputted), only the actual command between the identifiers may be extracted. Further, the controller 170 performs a search to determine whether the extracted command corresponds to a command designated in the local database, i.e., the command table of the storage unit 150. If the extracted command is a command in the command table, the controller 170 internally (i.e., in the background) performs the action for performance of the intelligent service. For example, the controller 170 may control an output a text corresponding to the command when the command requires a text input. Further, when the command means the execution of the service (or function, application) of the system such as "content player", not the text input, the service corresponding to the command may be executed and the output of the execution screen may be controlled.

Further, if the extracted command is a command which does not exist in the command table, the controller 170 transmits the action information including the command to the external server (e.g., an integrated server, a content server, etc.), and requests a response to the server so that the execution of the action on the command and the result may be transmitted. Further, if the result corresponding to the command is received from the server, the controller 170 may control to input and display the received result in the text box. That is, the controller 170 may dynamically obtain the result through the API or web parsing of the external server.

Figure 27:
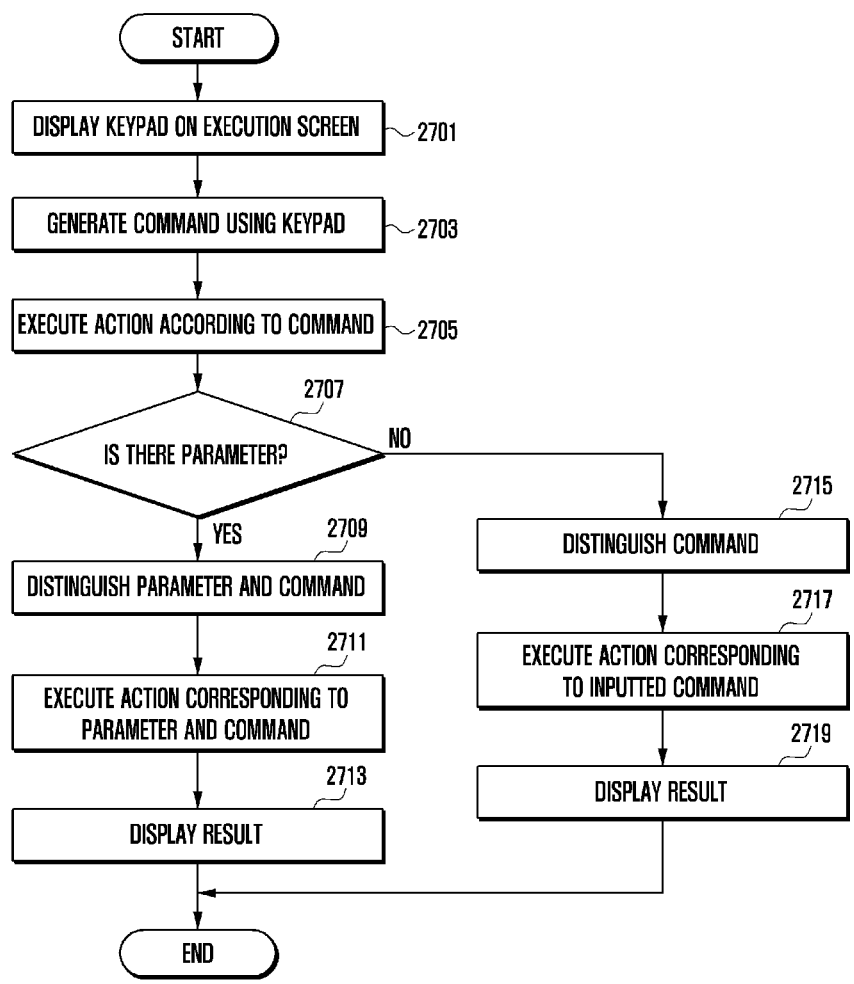
FIG. 27 is a flowchart illustrating an operation for providing an intelligent service in a user device according to an exemplary embodiment of the present invention.

FIG. 27 is a flowchart illustrating an operation for providing an intelligent service in a user device according to an exemplary embodiment of the present invention.

Referring to FIG. 27, the controller 170 controls the keypad display on the execution screen in response to the user's request in step 2701. For example, if the execution command of a certain application (e.g., a memo application, a chatting application, an e-mail application, etc.) occurs according to the control command inputted from user, the controller 170 may control the execution of the application and the display of the execution screen according thereto. Further, the controller 170 may activate the keypad on the execution screen of the application according to the user's request at the time of the execution of the application or after the execution of the application.

The controller 170 controls the command generation in response to the user's input using the keypad in step 2703. For example, the user may select an identifier (e.g., the start identifier) and a command of the intelligent service from a command candidate group region using the keypad or directly input the command, and the controller 170 may input the command according to the user's selection and input on the text box of the execution screen.

When sensing the execution of the action according to the generated command in step 2705, the controller 170 determines whether there is a character (i.e., a parameter) inputted before the command in step 2707. For example, after inputting the command, the user may input the identifier (e.g., the termination identifier) after the command or select a certain command from the command candidate group region. Then, the controller 170 determines the action execution when the termination identifier is inputted or a command is selected from the command candidate group region. Further, the controller 170 may determine whether a parameter (e.g., a character according to the user's input) exists before the command (e.g., before the start identifier) at the time of determining the action execution.

If there is a parameter (Yes of 2707), the controller 170 may divide the parameter and the command in step 2709 and execute an action (i.e., an intelligent service) corresponding to the parameter and command in step 2711. Further, the controller 170 may control the result display according to the action execution in step 2713. For example, if there is a parameter, the controller 170 may parse and divide the command between identifiers and the parameter, and control the action execution on the parameter at the time of the execution of the action. For example, the execution of the translation on the inputted parameter may be controlled. Further, the controller 170 may obtain the result information corresponding to the parameter through the database or Open API or a website search within the user device at the time of the execution of the action. Thereafter, the controller 170 may control the obtained result information to be displayed within the text box of the execution screen.

If the parameter does not exist (No of 2707), the controller 170 may classify the command in step 2715 and execute the action (i.e., intelligent service) corresponding to the command in step 2717. Further, the controller 170 may control the display of the result according to the action execution in step 2719. For example, if the parameter does not exist, the controller 170 may parse and classify the command between the identifiers, and may control the execution of the action for the command. The controller 170 may obtain the result information corresponding to the command through the database, open API or a website search, etc. within the user device at the time of the execution of the action. Thereafter, the controller 170 may control the obtained result information to be displayed within the text box of the execution screen.

Figure 28:
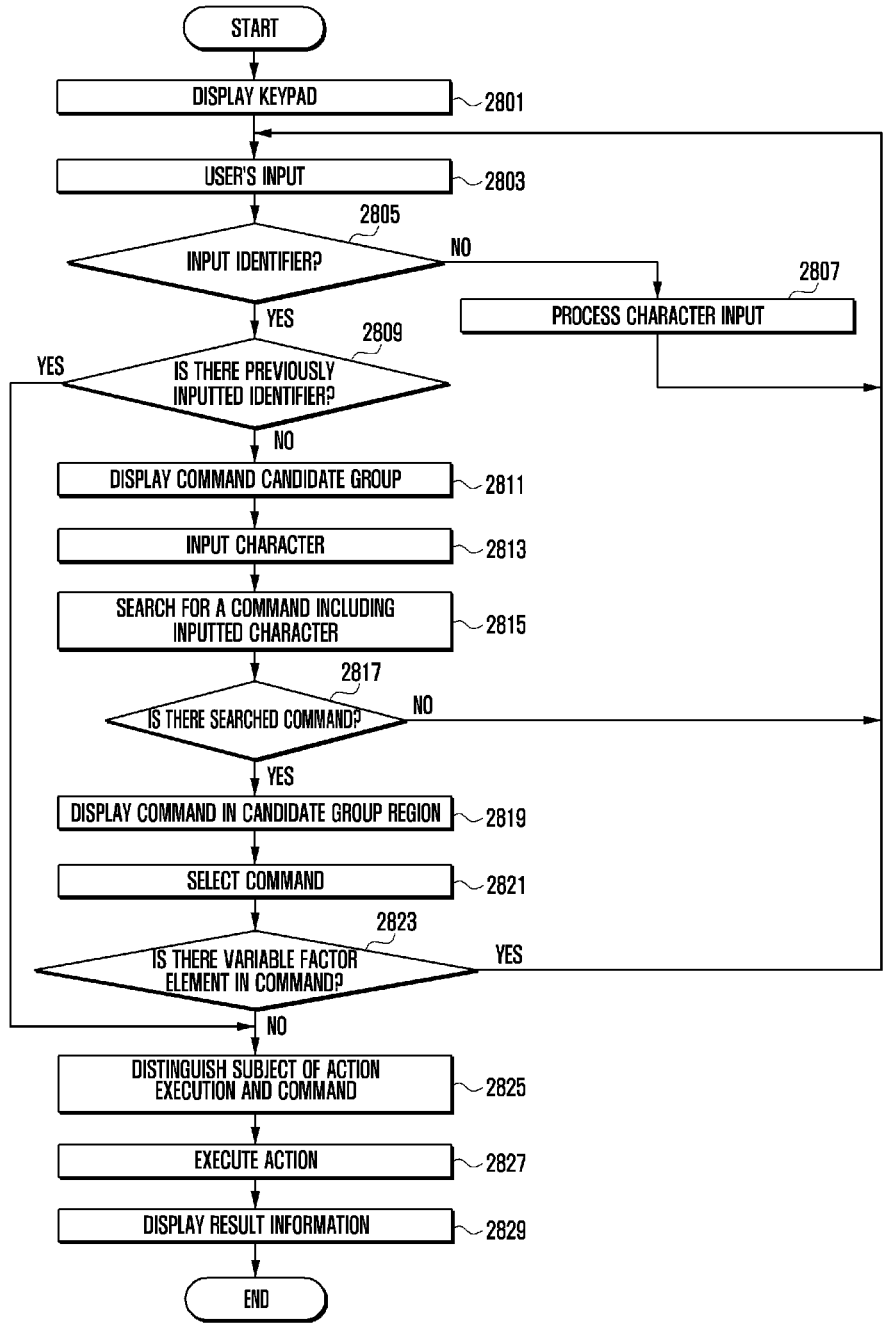
FIG. 28 is a flowchart illustrating an operation for providing an intelligent service in a user device according to an exemplary embodiment of the present invention.

FIG. 28 is a flowchart illustrating an operation for providing an intelligent service in a user device according to an exemplary embodiment of the present invention. In particular, FIG. 28 illustrates an example of a case where an intelligent service is executed using the command candidate group region.

Referring to FIG. 28, if a user's input is sensed in step 2803 in a state the keypad is displayed in step 2801, the controller 170 determines whether the user's input corresponds to the identifier input in step 2805. For example, if an input using the keypad is sensed from the user in a state where the user's input is possible using the keypad, the controller 170 may determine whether the user's input corresponds to the smart conversion button or identifier (e.g., "**").

If the user's input does not correspond to the identifier's input (No of 2805), the controller 170 may process the character input corresponding to the user's input in step 2807 and may return to step 2803.

If the user's input corresponds to the identifier's input (Yes of 2805), the controller 170 determines whether there is the identifier inputted before the identifier in step 2809. That is, the controller 170 may determine whether the inputted identifier corresponds to the initially inputted identifier (e.g., the start identifier) or the termination identifier for the action execution according to the intelligent service in a state where the start identifier is inputted.

If there is an identifier inputted before the identifier (Yes of 2809), the controller may proceed to step 2825 to control the following operations. If there is no identifier inputted before the identifier (No of 2809), the controller 170 controls the display of the command candidate group in step 2811. In particular, when only the identifier is inputted and a character corresponding to the command is not inputted, the controller 170 may control to determine all commands that support the intelligent service (i.e., all commands that are preset in the storage unit 150) as the command candidate group, and to display the commands in the command candidate region.

If the character is inputted after the identifier in step 2813, the controller 170 may search for a command including the inputted character in step 2815, and may determine whether there is the searched command in step 2817. At this time, the controller 170 may display the inputted character after the identifier. Further, the controller 170 may search for a command including the inputted character in commands that are preset in the storage unit 150 of the user device.

If the command including the inputted character is not searched (No of 2817), the controller 170 may return to step 2803. For example, if a command including the character is not searched by parsing the character inputted after the identifier, the controller 170 may proceed to step 2803 and wait for the user's input. At this time, the controller 170 may show the command candidate group region as an empty space or may remove the region from the execution screen. Further, the controller 170 may maintain the displayed state of all commands of the command candidate group provided in the command candidate group region, which may be provided differently according to the user's setting, and in an exemplary embodiment of the present invention, the command candidate group region may be provided as an empty space in consideration of the user's intuition, or may be removed in the execution screen. In such a case, the user may directly input commands according to the user's desire in addition to preset commands.

If the command including the inputted character is searched (Yes of 2817), the controller 170 controls the command including the character (i.e., the searched command) to be displayed on the command candidate group region in step 2819. In particular, when the character (part or whole) that constitutes the command with the identifier is inputted, the controller 170 may control to extract a command including the character among all commands (i.e., all commands that are preset in the storage unit 150) where an intelligent service is supported, to determine the extracted command as a command candidate group to be displayed on the command candidate region.

If a certain command is selected from the command candidate group region in step 2821, the controller 170 determines whether the selected command includes a variable factor in step 2823. For example, the controller 170 may determine whether an element for an input of a variable factor (e.g., command [ ], command &, etc.) is included in the command according to the user's selection in the command candidate region.

If the command includes a variable factor element (Yes of 2823), the controller 170 may return to step 2803. That is, user may input a variable factor using the keypad after selecting a command including a variable factor.

If the command does not include a variable factor element (No of 2823), the controller 170 may divide the action execution object (i.e., a parameter) and the command in step 2825. Here, the controller 170 may determine whether there is a parameter before the start identifier and may divide the parameter inputted before the start identifier and the command between identifiers when there is such a parameter.

The controller 170 executes an action (i.e., an intelligent service) corresponding to the action execution object and command (when there is no parameter, only the command is used) in step 2827, and controls the display of the result information corresponding to the execution of the action in step 2829. For example, the controller 170 may obtain the result information corresponding to the command through a database within the user's device, an open API or a website search at the time of the execution of the action. Thereafter, the controller 170 may control the obtained result information to be displayed within the text box of the execution screen.

Figure 29:
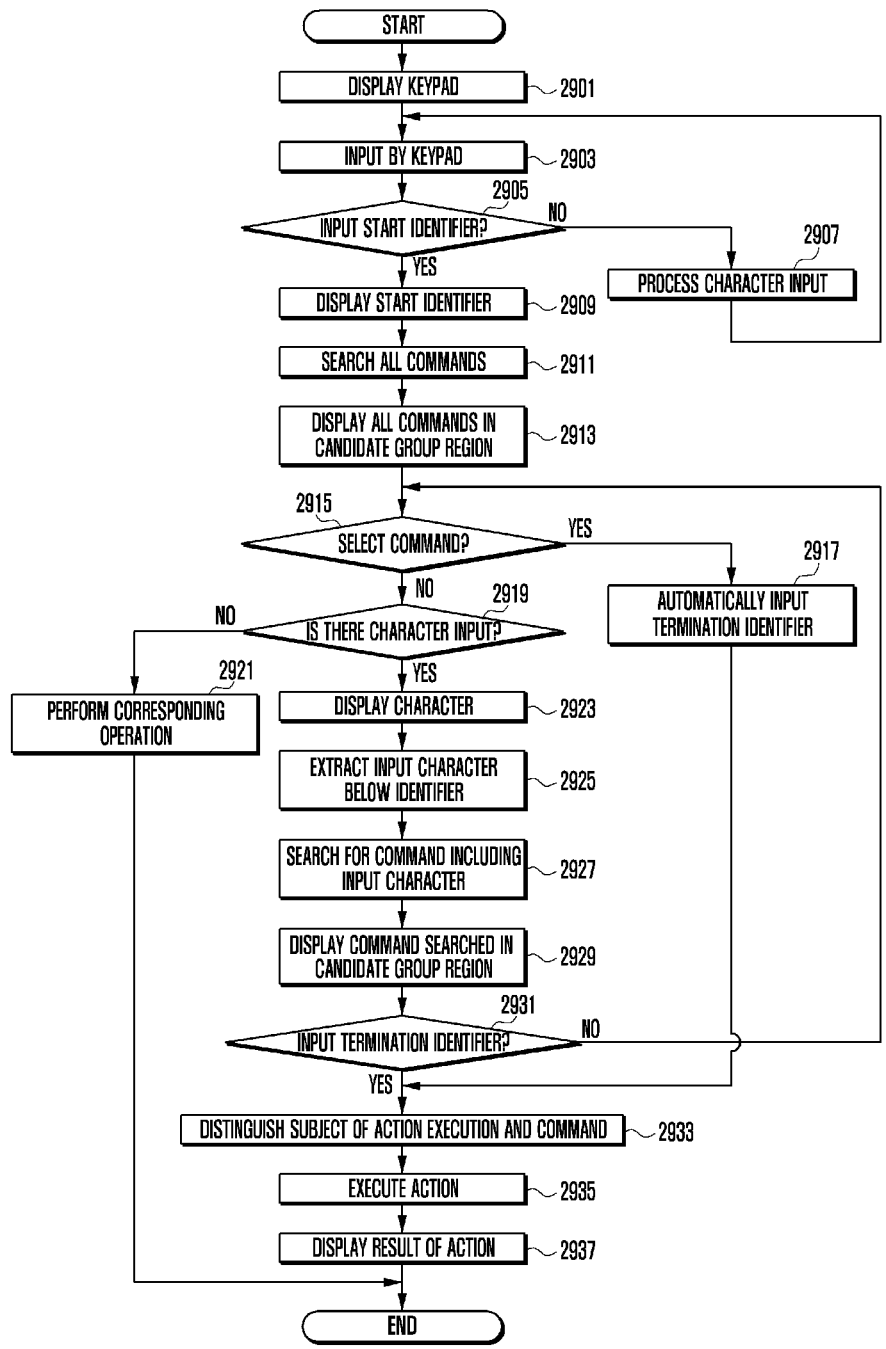
FIG. 29 is a flowchart illustrating a specific operation for providing an intelligent service in a user device according to an exemplary embodiment of the present invention.

FIG. 29 is a flowchart illustrating a specific operation for providing an intelligent service in a user device according to an exemplary embodiment of the present invention.

Referring to FIG. 29, in a state where the keypad is displayed in step 2901, if a user's input using the keypad is sensed in step 2903, the controller 170 determines whether the user's input corresponds to the start identifier input in step 2905. For example, in a state where the user's input using the keypad is possible, if an input using the keypad from the user is sensed, the controller 170 may determine whether the user's input corresponds to a smart conversion button for the start identifier or a character (e.g., "**") input. That is, steps 2901 to 2905 correspond to the operation where the user starts an intelligent service after activation of the keypad. Hence, the user may perform an input for the start identifier or a parameter for the object of execution of the action using the keypad.

If the user's input does not correspond to the input of the start identifier (No of 2905), the controller 170 may process the character input corresponding to the user's input in step 2907 and may return to step 2903. That is, user may input the parameter, which is the object of execution of the action, and the controller 170 may display the inputted character in the text box in response to the user's input.

If the user' input corresponds to the start identifier input (Yes of 2905), the controller 170 controls the identifier to be displayed in the text box in step 2909. Further, the controller 170 may search for all preset commands in step 2911 and may control the display of searched commands in the command candidate group region in step 2913. For example, the controller 170 may search for all commands, which are preset and provided for an intelligent service, from the storage unit 150, determine searched commands as a command candidate group, and display the commands in the command candidate group region.

The controller 170 determines whether there is a command selection after displaying the command candidate group through the command candidate group region in step 2915. For example, user may select one of all preset commands displayed through the command candidate group.

If there is a command selection (Yes of 2815), the controller 170 may automatically input a termination identifier in step 2917. That is, if a certain command is selected from the command candidate group region, the controller 170 may generate a termination identifier after the selected command, and automatically complete a state for an execution of an action (i.e., an intelligent service). The controller 170 may automatically input a termination identifier and control the following operation by proceeding to step 2933.

If there is no command selection after controlling to display the start identifier and the command candidate group region (No of 2915), the controller 170 determines whether there is a character input in step 2919. That is, the controller 170 may determine whether there has been a character input using the user's keypad behind the start identifier.

If there is no character input (No of 2919), the controller 170 may control the operation corresponding to the user's request in step 2921. For example, if there is no character input, the controller 170 may wait for a character input or a command selection, or may terminate the operation of the execution of the intelligent service according to the user's request.

If there is a character input behind the start identifier (Yes of 2919), the controller 170 may control to display the input character behind the start identifier displayed on the text box of the execution screen in step 2923, and may extract the input character inputted behind the start identifier in step 2925. Further, the controller 170 may search for a command including the extracted input character in step 2927, and may control to display at least one searched command on the command candidate group region in step 2929. For example, if a character is inputted behind the start identifier, the controller 170 may search for a command including the input character among all commands, which are preset and provided for the intelligent service, from the storage unit 150, determine at least one searched command as the command candidate group, and display the command in the command candidate group region. That is, commands displayed in the command candidate region at step 2913 may be substituted by at least one command including the input character.

After the process on the input character, the controller 170 determines whether there is a termination identifier input behind the input character in step 2931. For example, the controller 170 may determine whether there is a character (e.g., "**") corresponding to a smart conversion button or a termination identifier for the input of the termination identifier using the keypad.

If there is no termination identifier (No of 2931), the controller 170 may control the performance of the following operation by returning to step 2915.

When there is a direct input of the termination identifier by user or a termination identifier is automatically inputted according to the command selection of the command candidate region at steps 2915 and 2917, the controller 170 may distinguish the subject (i.e., parameter) of the action performance from the command in step 2933. For example, when the execution of the action is determined by the input of the termination identifier, the controller 170 may distinguish the character (e.g., parameter in front of the start identifier) from the character (e.g., command) behind the start identifier based on the start identifier. At this time, the controller 170 may determine whether there is an inputted character (e.g., parameter) in front of the start identifier, and may distinguish only the command if there is no parameter.

The controller 170 performs an action (i.e., intelligent service) corresponding to the subject of action execution and a command (only the command is used if there is no parameter) in step 2935, and controls the display of the result corresponding to the execution of the action in step 2937. For example, the controller 170 may obtain result information corresponding to the action through a database implemented in the storage unit 150, an open API, a website search, etc. in response to the execution of the action (i.e., intelligent service) corresponding to the command, and may control the obtained result to be displayed in the text box. Here, when there is a parameter, the controller 170 may convert the parameter according to the command, and when there is no parameter, the controller 170 may perform the function for the command and output the result, or may obtain and output the result according to the command.

Hereinafter, an operation of providing an intelligent service according to an exemplary embodiment of the present invention by being linked with at least one external service will be considered.

Figure 30:
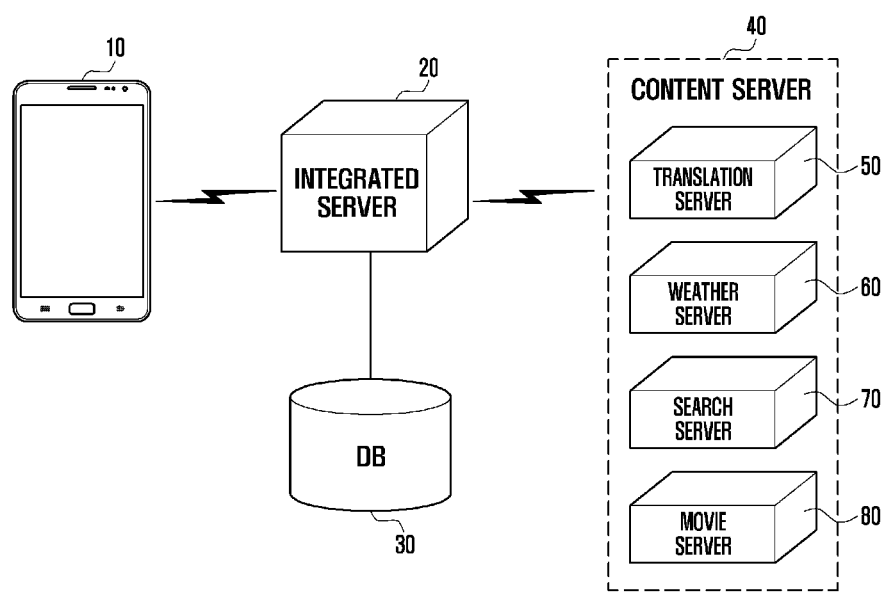
FIG. 30 schematically illustrates a system configuration for supporting an intelligent service according to an exemplary embodiment of the present invention.

FIG. 30 schematically illustrates a system configuration for supporting an intelligent service according to an exemplary embodiment of the present invention.

Referring to FIG. 30, the system for supporting an intelligent service of the present invention may include a user device 10, an integrated server 20 and a content server 40. It is to be understood that the components illustrated in FIG. 30 are not essential for the system for supporting an intelligent service of the present invention, and thus the system may be implemented to include more or fewer components.

The user device 10 supports an intelligent service using a keypad. When the intelligent service is executed, the user device 10 may connect to the integrated server 20 to obtain result information provided by the integrated server 20 or the content server 40, or may connect to the content server 40 to obtain result information provided by the content server 40. The user device 10 may be executed as one of an internal action execution directly executed within the user device 10 or an external action execution executed by being linked with an external server at the time of action execution. For example, the user device 10 may distinguish a command requested at the internal action execution or may output the result according to the function execution, conversion and search, etc. corresponding to the command.

Further, when an external action is executed, the user device 10 transfers the action execution to the integrated server 20 or the content server 40 so that the command may be processed in the server, and receives the result processed in the server so that the intelligent service may be supported in the provided method. That is, when the external action is executed, the user device 10 may transmit the action information to the integrated server 20 or may transmit the action information to a certain content server 40. Here, the action information may include only a command generated by user using the keypad or may include both a parameter and a command.

When commands (all commands or a command including an input character) are displayed on the command candidate group region according to the above-considered procedure, the user device 10 may receive the command list from the integrated server 20 and output the commands. That is, the user device 10 may be connected to the integrated server 20 to perform a search of the command, and may receive and provide the searched command.

The user device 10 may store the command list in the storage unit 150 or may be provided the command list in real time by being linked with the integrated server 20. The user device 10 may be provided the command list stored in the integrated server 20 using the integrated server 20 as web storage. Further, the user device 10 may update (e.g., add) a command stored in the storage unit 150 by downloading the commands added in the integrated serve 20 according to the update period.

The integrated server 20 may receive action information from the user device 10 and process the action according to the action information. When action information is received, the integrated server 20 may parse the action information to extract a command, and may execute an action corresponding to the extracted command. Further, the integrated server 20 may transmit the result according to the executed action to the user device 10. For example, when the parameter of "Annyunghaseyo" and "English translation" command for the parameter are parsed from the action information, the integrated server 20 may generate "Hello" result by executing the English translation on the "Annyunghaseyo" through an internal translation application, and may transmit the generated "Hello" result to the user device 10.

If the action information received from the user device 10 is a result (e.g., weather information, movie information, search, etc.) that requires a dynamic conversion, or an action which is not internally processed, the integrated server 20 may search for a content server 40 which allows an action execution of the command and may transmit the action information to the searched content server 40. That is, the integrated server 20 may include mapping information of the command with the content server 40 for processing the command. Thereafter, the integrated server 20 may receive result information according to the action execution from the content server 40, and may transmit the received result information to the user device 10. For example, when the parameter of "Annyunghaseyo" and the "Japanese translation" command for the parameter are parsed, the integrated server 20 may transmit the action information and request the action execution to the translation server that is appropriate for the execution of the action related with the translation in the content server 40. Further, the result "こんにちは" is received from the translation server, and, and the result may be transmitted to the user device 10.

Here, the integrated server 20 may have the relation (i.e., the mapping information) with content server 40 corresponding to the command in the database 30. For example, the integrated server 20 may map a command with information of a content server 40 that may execute the action of the command, as in the command including "translation" with "translation server", "weather" command with "weather server", "movie" command with the "movie server", and may store the mapping information in the database 20. That is, the integrated server 20 may determine from the internal command table recorded in the database 20 whether the command received from the user device 10 is a command that may be performed.

The content server 40 may receive action information from the user device 10 or the integrated server 20, and may process the action according to the action information. When the action information is received, the content server 40 may extract the command by parsing the action information, and may execute the action corresponding to the extracted command. Further, the content server 40 may transmit the result according to the executed action to the user device 10 or the integrated server 20 (i.e., the other user that has transmitted the action information). That is, in an exemplary implementation, the content server 40 may represent a server that is optimized in the action execution according to a certain command. For example, the content server 40 may include a translation server 50, a weather server 60, a search server 70 and a movie server 80, etc.

Figure 31:
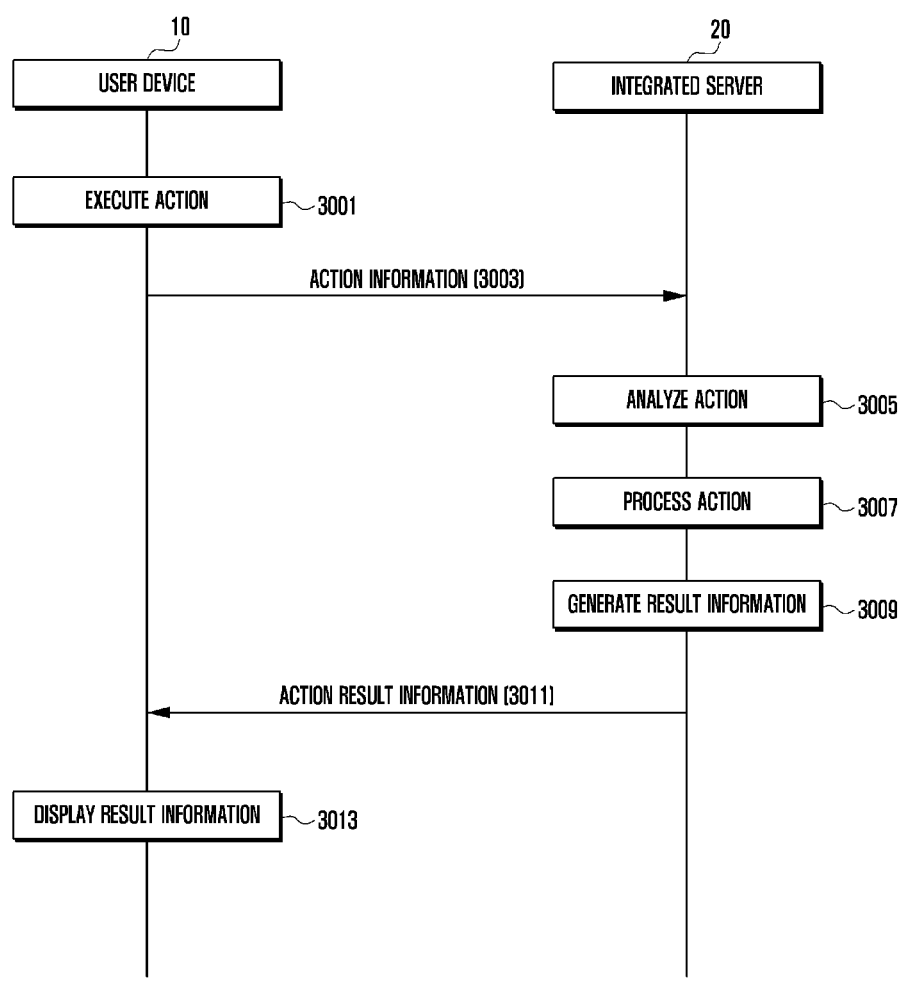
FIG. 31 is a signal flow diagram illustrating an operation in which an intelligent service is provided in a system according to an exemplary embodiment of the present invention.

FIG. 31 is a signal flow diagram illustrating an operation in which an intelligent service is provided in a system according to an exemplary embodiment of the present invention.

Referring to FIG. 31, if an action execution for an intelligent service is detected using the keypad from user in step 3001, the user device 10 may transmit the action information corresponding to the intelligent service to the integrated server 20 in step 3003. The action information may be configured by the command according to the user's input or may be configured by the command and the parameter, which is the subject of action execution according to the user's input.

The action information may be transmitted through the mobile communication module 111 according to the control of the controller 170 or may be transmitted through the wireless LAN module 113. That is, the user device 10 and the integrated server 20 may transmit and receive data through the wireless interface. However, in the case of a mobile communication, a money charge may occur according to the service providing type of the communication company. Hence, the user device 10 may transmit and receive data based on the wireless Internet communication by the wireless LAN, and if the wireless Internet connection by wireless LAN is impossible, the data transmission and reception by the mobile communication may be performed. At this time, the operation of performing the action according to the user's selection may be included in the case of the mobile communication.

Here, the user device 10 may determine whether the action may be processed when the execution of the action is detected. At this time, when the processing of the action is internally possible, the user device 10 may provide the result through the internal action performance. In contrast, if the process of the action is internally impossible or a dynamically changing result text, not the text-based intelligent service, is needed, the user device 10 may generate action information and transmit the generated information to the integrated server 20.

If the action information is received from the user device 10, the integrated server 20 may parse the action information and analyze the command in step 3005. For example, the integrated server 20 may parse the command (or parameter and command) from the received action information, and may determine whether the command is a command that may be performed by referring to the internal command table.

If the command may be performed, the integrated server 20 processes the action according to the command in step 3007. Further, the integrated server 20 generates the result information according to the action process in step 3009, and transmits the generated result information to the user device 10 in step 3011. The integrated server 20 and the user device 10 may transmit and receive data through the wireless interface.

If the result information is received from the integrated server 20, the user device 10 may display the received result information in the text box in step 3013.

Figure 32:
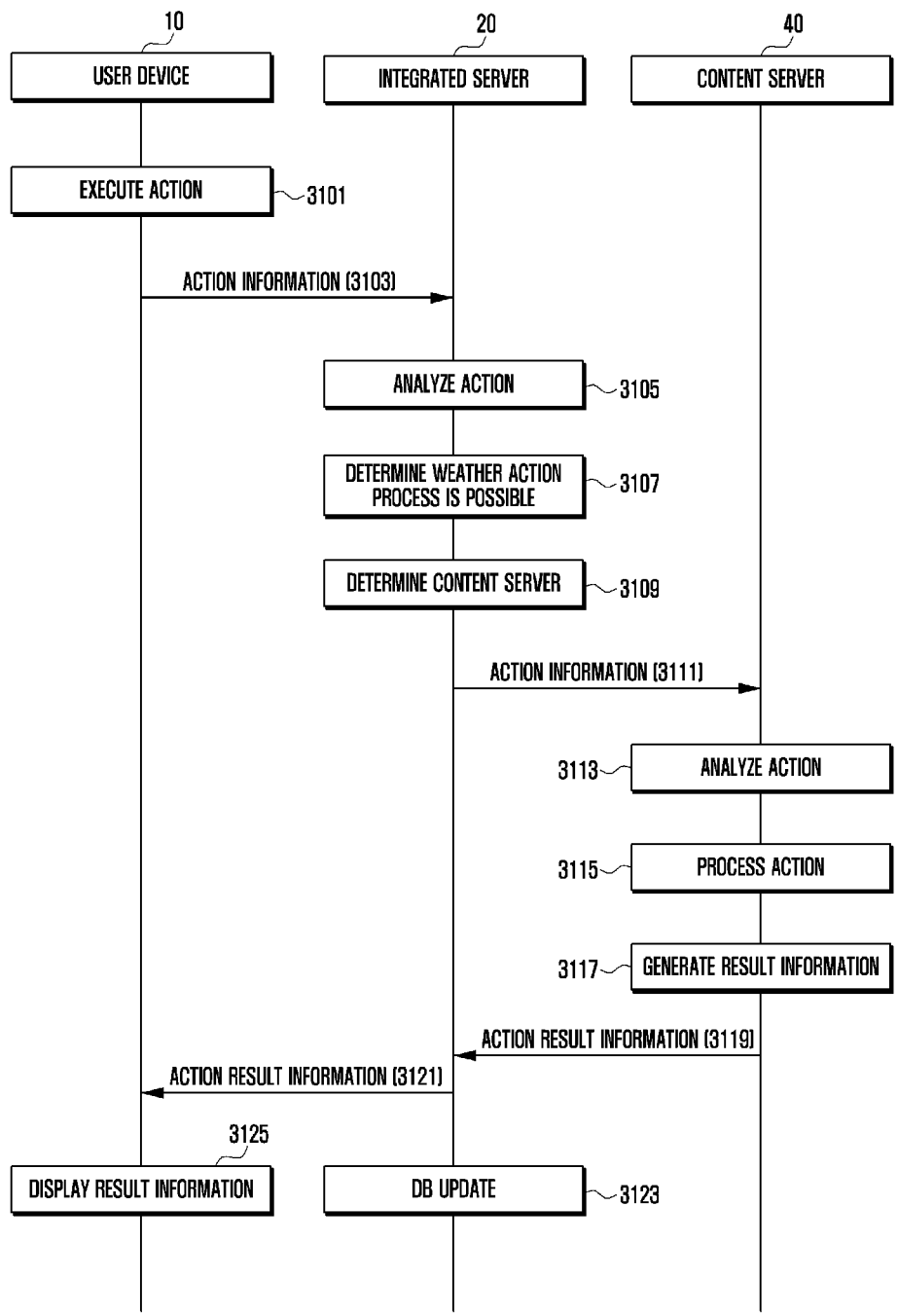
FIG. 32 is a signal flowchart illustrating an operation where an intelligent service is provided in a system according to an exemplary embodiment of the present invention.

FIG. 32 is a signal flowchart illustrating an operation where an intelligent service is provided in a system according to an exemplary embodiment of the present invention.

Referring to FIG. 32, if an action execution for an intelligent service using the keypad is detected from user in step 3101, the user device 10 may transmit the action information corresponding to the intelligent service to the integrated server 20 in step 3103. The action information may be configured by the command according to the user's input or may be configured by the command and the parameter which is the subject of action execution according to user's input.

The integrated server 20 may parse the action information received from the user device 10 and analyze the action in step 3105. Further, the integrated server 20 may determine whether the action process is possible from the received action information in step 3107. That is, the integrated server 20 may determine whether the command of the received action information is a command that may be performed by referring to the internal command table.

If the performance of the command is impossible, the integrated server 20 may determine a content server 40 capable of actions for the command in step 3109. For example, when the command of the action information needs the dynamically changed text result, not a simply matched text, the integrated server 20 may determine the content 40 that allows the action performance for the command. Further, the integrated server 20 may transmit the received action information to the determined content server 40 in step 3111.

If the action information of the user device 10 is received from the integrated server 20, the content server 40 may analyze the command by parsing the action information in step 3113 and process the action according to the command of the action information in step 3115. Further, the content server 40 may generate result information according to the action process in step 3117 and transmit the generated result information to the integrated server 20 in step 3119.

If the result information on the request action from the content server 40 is received, the integrated server 20 transmits the received result information to the user device 10 in step 3121. That is, the integrated serve 20 may dynamically generate result information through the web parsing or the service API of the previously determined content server 40, and provide the result information to the user device 10. Here, if the result information on the action is received from the content server 40, the integrated server 20 may map the command of the action information with the result information and update the database 30 in step 3123. The integrated server 20 may form various commands and result information corresponding each command as a database.

If the result information is received from the integrated server 20, the user device 10 may display the received result information in the text box in step 3125.

Figure 33:
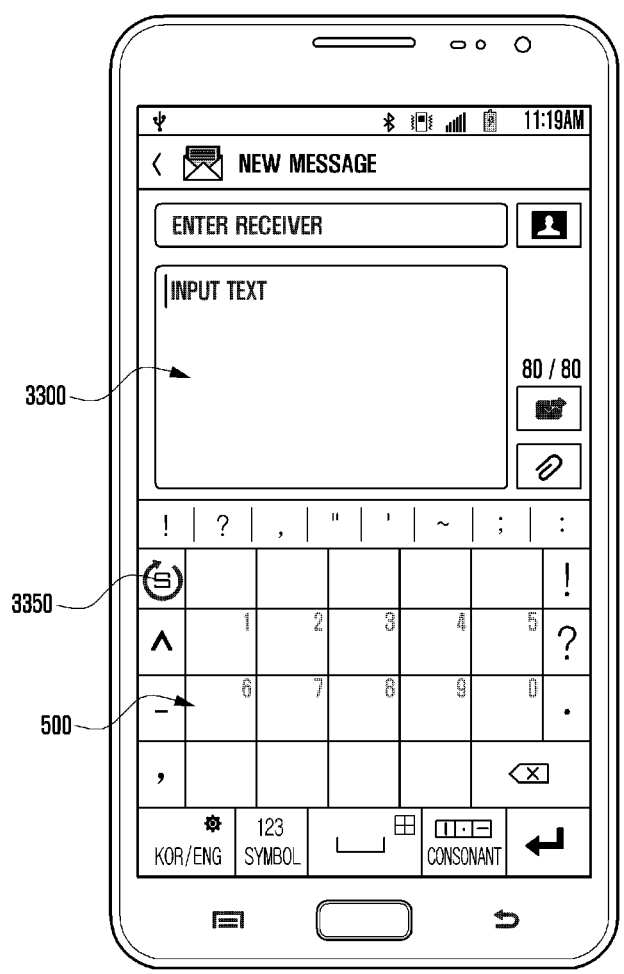
FIGS. 33 to 35 illustrate an operation in which an intelligent service is performed according to an exemplary embodiment of the present invention.
Figure 34:
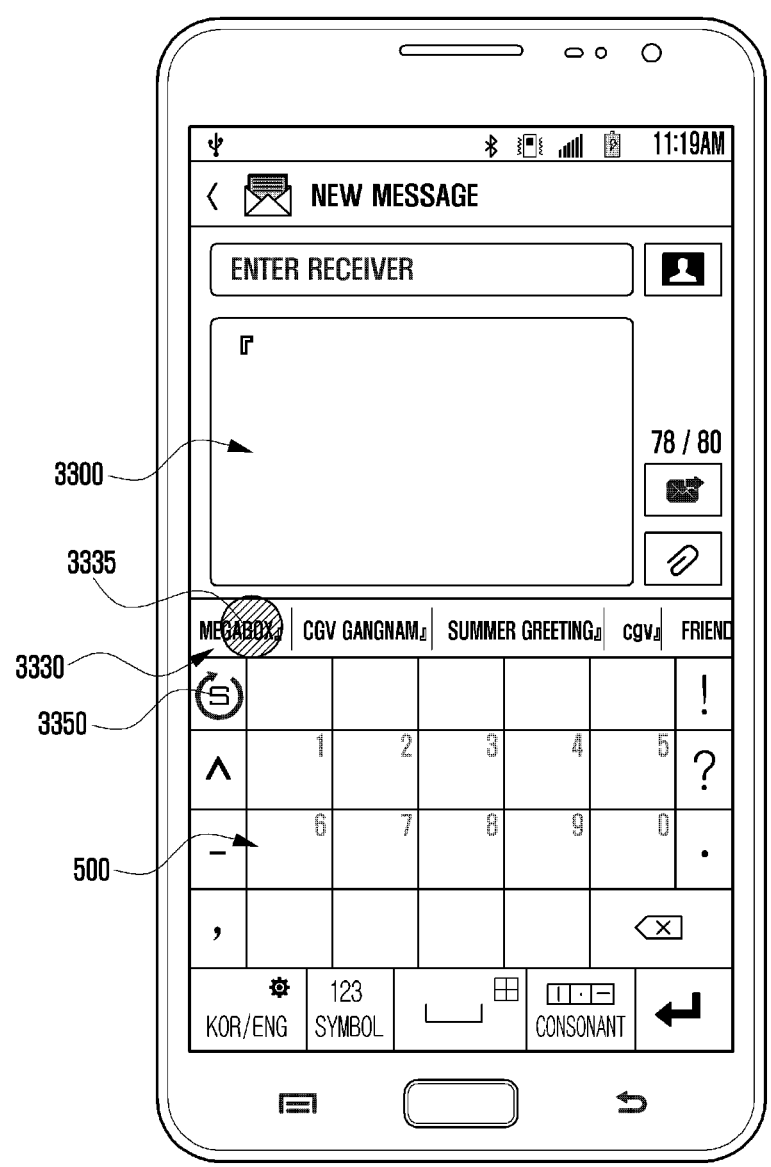
Figure 35:
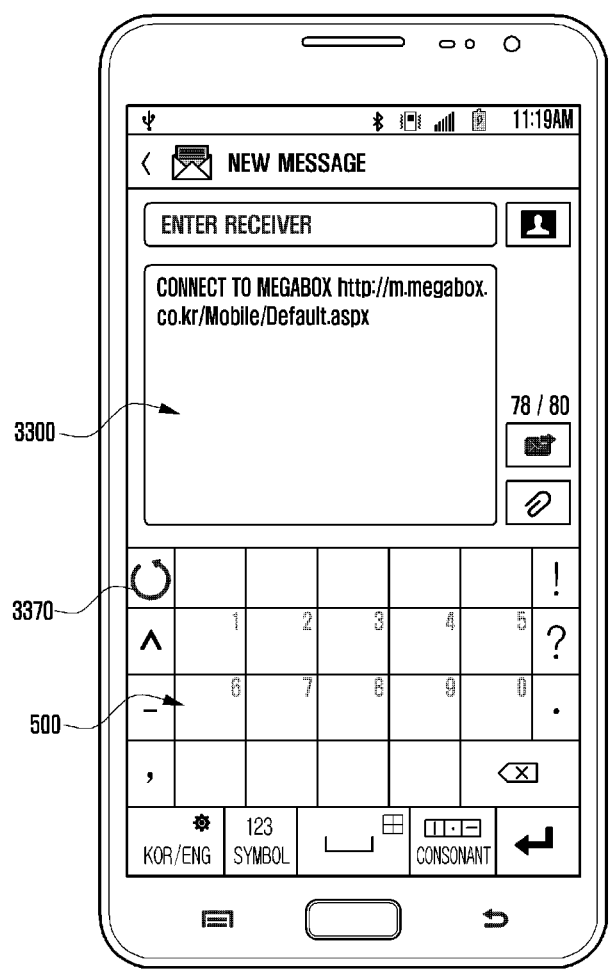

FIGS. 33 to 35 illustrate an operation in which an intelligent service is performed according to an exemplary embodiment of the present invention.

Referring to FIGS. 33 to 35, FIG. 33 illustrates a case where an icon (or a label) (e.g., ■ ), which may be intuitively recognized as a smart conversion button for inputting an identifier for identifying an execution command of an intelligent service by the smart conversion button 3350, is implemented as a printed button. Further, FIGS. 33 to 35 illustrate a case where the identifier for identifying the start of the command for the execution of the intelligent service is "「" and the identifier for identifying the termination of the command is "」". That is, the command may be completed by "「」" in FIGS. 33 to 35.

Referring to FIGS. 33 to 35, FIG. 33 illustrates an example of a screen (e.g., a message execution screen) of a user device when the user device is executing a message application. For example, if the execution command of the message application occurs according to the control command inputted from user, the message application may be controlled so that the screen in a state where the operation for waiting for a user's character input for message writing is being performed may be provided.

Here, the keypad 500 may be provided by the user's activation request or may be shown together at the time of execution of the message application. That is, as illustrated in FIG. 33, the message execution screen may be implemented to include an execution screen region where characters (i.e., a string) corresponding to the user's character input are displayed, and a keypad region where a keypad 500 for receiving the input of the identifier and command for the execution of the intelligent service in addition to the user's character input is provided. The message execution screen of the present invention is not limited to the components illustrated in FIGS. 33 to 35, and may be implemented as various forms of UIs or GUIs.

The user may input an identifier for command identification according to the intelligent service in a state where the message execution screen is displayed. For example, as illustrated in FIG. 33, the user may select (e.g., touch) a smart conversion button 3350 for generating and inputting an identifier for identifying a command according to an intelligent service in the keypad 500. It is assumed in FIG. 34 that the identifier defined by the smart conversion button 3350 is "「".

If the smart conversion button 3350 is inputted, the user device displays a screen as in FIG. 34. The screen of the user device shown in FIG. 33 may be converted into the screen shown in FIG. 34 depending on the selection of the user's smart conversion button 3350.

As illustrated in FIG. 34, the identifier "「" predefined in the message execution screen may be inputted and shown. Here, when the identifier "「" is inputted from user by the smart conversion button 3350, the user device may activate the command candidate region 3330 on one region of the keypad 500 or message execution screen 3300, or may provide a command candidate through the command candidate region 3330.

In FIG. 34, the command candidate group provided to the command candidate group region may provide candidates of all commands predefined in the user device according to the input of the identifier. That is, in the case of FIG. 34, all commands predefined in the user device may be shown on the command candidate group region 3330 according to the state where only identifier "「" is inputted.

Here, FIG. 34 shows a case where the command candidate of the command candidate group region 3330 is provided including termination identifier "」" in consideration of the user's intuition. Further, in FIG. 34, the smart conversion button 3350 may be displayed differently from FIG. 33 so that the start identifier "「" is inputted and the state of waiting for an input of a command is intuitively shown. For example, the icon of the smart conversion button 3350 may be displayed as a highlight, displayed in another changed color, displayed having a different thickness, etc.

The user may select (e.g., touch) a certain command for performing an intelligent service in a state where a command candidate group region 3330 is displayed as in FIG. 34. For example, user may select (e.g., touch) a region 3335 where "megabox ⌐" command is allocated in the command candidate group region 3330 in a state where "⌐" is inputted.

As illustrated in FIG. 34, in a state where the start identifier "⌐" is inputted, if the command of "megabox ⌐" is selected (e.g., touched) in the command candidate group region 3330, the execution of the intelligent service may be determined after automatic completion as in "⌐ megabox ⌐". That is, when a certain command is selected in the command candidate group region 3330, the second identifier (i.e., termination identifier) for the termination of the command after the command may be automatically inputted. Here, in an exemplary implementation, when the user selects the command in the command candidate group region 3330 in consideration of convenience of explanation and the user's intuition, the state where the selected command and the termination identifier are inputted may be temporarily displayed for a certain period of time (e.g., a few preset seconds).

Further, when the input (i.e., selection) of the command is completed by user, the user device may analyze the inputted command and execute the intelligent service according to the result of analysis as to display the result screen. That is, the screen of the user device shown on FIG. 34 may be converted as in FIG. 35 according to the execution of the intelligent service.

If the execution of the intelligent service is determined according to "⌐ megabox ⌐" as described above, the user device may analyze the command between the start identifier (⌐) and the termination identifier (⌐). Further, if the analyzed command corresponds to "megabox" as described above, the user device displays the result screen in the text box (i.e., message execution screen) 3300 as in "connect megabox http://m.megabox.co.kr/Mobile/Default.aspx" as illustrated in FIG. 35. That is, the screen of the user device is converted into a screen where the result after the process of the intelligent service is displayed according to the command inputted (selected) by user.

Further, in a state where the result as in FIG. 35 is outputted according to the procedure as in FIGS. 33 and 34, the converted result may not be the result desired by user.

If the result is not what has been desired by the user or the user incorrectly inputs the command, the function for restoring the state is provided in an exemplary embodiment of the present invention. For example, in order to restore the previous state, if the smart conversion button 3350 is reselected, the restoration into the previous state of the result output (i.e., the conversion test output) according to the execution of the intelligent service may be possible. At this time, in an exemplary embodiment of the present invention, an icon (or label) of another form, which may inform of the fact that restoration into the previous state may be possible through the smart conversion button 3350, may be provided in consideration of the user's intuition. Such an example is illustrated in FIG. 35.

Referring to FIG. 35, when the screen is converted into the result screen as in FIG. 35 according to the execution of the intelligent service, the smart conversion button 3350 of FIG. 34 may be changed to the smart conversion button 3350 of FIG. 35. As illustrated in the smart conversion button 3350 of FIG. 35, the icon (or label) of the smart conversion button 3350 may be changed to the icon (or label) (e.g., ■) meaning the restoration (i.e., undo), and be provided to user.

Here, in an exemplary embodiment of the present invention, an icon (or label) (■), which means the execution of an intelligent service of the smart conversion button 3350, and an icon, which means the restoration (■), may be variously provided in consideration of the user's intuition. For example, in the case of an icon which means the execution as described above, the combined form of the clockwise arrow and character "S" indicating the smart conversion function may be provided, and in the case of an icon meaning restoration, the counter-clockwise arrow to may be provided to indicate restoration (undo) in a state where character "S" is omitted.

Hence, in a state as in FIG. 35, if the smart conversion button 3350 where the icon (or label) is displayed as an icon (or label) 3370 of a restoration form is reselected, the restoration into the state before the result screen output (conversion text output) is performed. That is, the screen of the user device (e.g., result output screen through the text box) is converted into a screen before the intelligent service is processed in response to the re-selection (e.g., touch) of the user's smart conversion button 3350. For example, the screen of FIG. 35 may be converted (restored) into a screen before the output of the result through the text box as in the screen of FIG. 34. Further, the screen may also be converted into a screen of FIG. 33 which is the state before the identifier is inputted.

Further, in a state where the icon (or label) of the smart conversion button 3350 is displayed as an icon (or label) 3370 of a restoration form, if the user inputs (e.g., selects) another button of the keypad 500, which is not the smart conversion button 3350, the icon (or label) 3370 of a restoration form of the smart conversion button 3350 may be returned to a form of the original icon (or label). That is, the form of the smart conversion button 3350 of FIG. 35 may be returned to the type of the smart conversion button 3350 of FIG. 33 or FIG. 35.

The foregoing exemplary embodiments of the present invention may be implemented in an executable program command form by various computer means and be recorded in a computer readable recording medium. In this case, the computer readable recording medium may include a program command, a data file, and a data structure individually or a combination thereof. In the meantime, the program command recorded in a recording medium may be specially designed or configured for the present invention or be known to a person having ordinary skill in a computer software field to be used. The computer readable recording medium includes Magnetic Media such as hard disk, floppy disk, or magnetic tape, Optical Media such as Compact Disc Read Only Memory (CD-ROM) or Digital Versatile Disc (DVD), Magneto-Optical Media such as floptical disk, and a hardware device such as ROM. RAM, flash memory storing and executing program commands. Further, the program command includes a machine language code created by a complier and a high-level language code executable by a computer using an interpreter. The foregoing hardware device may be configured to be operated as at least one software module to perform an operation of the present invention, and vice versa.

According to an exemplary method and apparatus for providing an intelligent service using an inputted character in a user device suggested in the present invention, an inputted character may be recognized through a keypad, a command corresponding to the inputted character may be automatically executed, and information processed (acquired) according to the recognized command may be fed back so as to provide various intelligent services may be provided in the user device. According to exemplary embodiments of the present invention, a user may be provided the result of the intelligent service for a certain command identifier and a command designated through a command input. That is, the user may be provided various extended and convenient services.

Further, according to exemplary embodiments of the present invention, as an intelligent service (e.g., a translation service) is provided through an open API, even if a keypad of a user device has been developed in a certain language, the translated result may be inputted in various languages desired by the user using only a given keypad. Hence, various languages may be covered in a keypad provided in a limited language in a user device, which is advantageous.

Further, according to exemplary embodiments of the present invention, as an execution of an intelligent service is supported through a keypad of a user device, user may use an intelligent service more conveniently and quickly. Further, according to exemplary embodiments of the present invention, by intuitively providing a command candidate (e.g., all command candidates, candidates corresponding to the designated character), a user may easily know which command may be used. Further, according to exemplary embodiments of the present invention, a command for executing an intelligent service is not limited, and an arbitrary command input is supported, thereby configuration of various commands and execution of corresponding intelligent services become possible. Hence, the user may be provided various extension conveniences regardless of limited commands in inputting commands.

Hence, according to exemplary embodiments of the present invention, by implementing an optimal environment capable of providing various intelligent services in real time using an inputted character in a user device, a user's convenience may be improved, and the user device's usability, convenience and competitiveness may be improved. Such a present invention may be simply implemented in all types of user devices having a character input function using a key pad and various devices corresponding to the user devices.

While the invention has been shown and described with reference to certain exemplary embodiments thereof, it will be understood by those skilled in the art that various changes in form and details may be made therein without departing the spirit and scope of the present invention as defined by the appended claims and their equivalents.

What is claimed is:

1. A method of providing a service using a keypad, the method comprising:
    displaying a text input field and a keypad on an executed screen;
    receiving a selection of a predetermined button of the keypad;
    displaying at least one identifying character into the text input field in response to the selection of the predetermined button;
    receiving an input of a command when the at least one identifying character is displayed;
    displaying the inputted command after the at least one identifying character; and
    in response to receiving the input of the command, executing the inputted command to produce a result, removing display of the command, and replacing the display of the command with a display of the result of the command within the text input field.

2. The method of claim 1, wherein the displaying of the command comprises:
    displaying all preset commands in a command candidate group region if the at least one start identifying character is inputted;
    receiving a selection of a command in the command candidate group region; and
    displaying the selected command after the identifier.

3. The method of claim 2, further comprising:
    displaying at least one termination identifying character if the command is selected in the command candidate group region.

4. The method of claim 2, wherein the displaying of the command comprises displaying the command according to a user's selection using the keypad after displaying the at least one start identifying character.

5. The method of claim 4, wherein the displaying of the command comprises:
    receiving input of a character for the command after the at least one identifying character; and
    displaying the command including the character in the command candidate region.

6. The method of claim 5, wherein the displaying of the command comprises:
    extracting a command candidate group including the character from the preset all command candidate group; and
    substituting the all commands of the command candidate group region with commands of the extracted command candidate group, and displaying the substituted commands.

7. The method of claim 4, wherein the displaying of the at least one identifying character comprises at least one of automatically inputting the at least one identifying character according to selection of the command including the character in the command candidate group region, displaying the at least one identifying character according to selection of the predetermined button of the keypad after the character is inputted.

8. The method of claim 1, further comprising:
    receiving a selected input of the predetermined button of the keypad in a state where the searched information is outputted in the text input field; and
    restoring a screen in a state before the searched information is outputted through the text input field according to selection of the predetermined button of the keypad.

9. The method of claim 1, further comprising:
    displaying the at least one identifying character and at least one termination identifying character by a user's direction input using the keypad.

10. The method of claim 1, wherein the searching at least one information comprises:
    determining whether there is a parameter in front of the at least one identifying character, and
    distinguishing, if there is the parameter in front of the at least one identifying character, a parameter inputted in front of the at least one identifying character and a command after the at least one identifying character.

11. The method of claim 1, wherein the searching at least one information comprises:
    extracting an actual command after the at least one identifying character;
    determining whether the extracted command corresponds to a command designated in a command table;

performing the command internally if the command is a command in the command table; and executing the command corresponding to the command by being linked with an external server if the command is a command that is not in the command table.

12. The method of claim 11, wherein the replacing of the display of the command comprises outputting a result according to performance of an internal command or replacing of the display of the command with a result received from the external server according to performance of the command by being linked with the external server.

13. The method of claim 11, wherein the external server includes at least one of an integrated server and a content server.

14. The method of claim 13, further comprising:
determining whether the command corresponds to a command that may be performed when receiving action information including the command from a user device;
performing a search according to the command if the command may be performed, and transmitting a result of the search to the user device;
requesting performance of the search according to the command by being linked with the content server if the command may not be performed; and
receiving the result of the performance of the search of the command from the content server, and transmitting the result to the user device.

15. A method of providing a service using a keypad, the method comprising:
displaying a keypad on a performance screen;
generating a command in a text input field in response to a user's input using the keypad;
displaying the inputted command in the text input field;
determining a service performance according to the generated command;
determining whether there is a parameter inputted before the command when the service is performed;
performing the service according to the command based on the parameter if there is such a parameter, and removing display of the command from the text input field and replacing the display of the command with a display of a result of the performance of the service in the text input field; and
performing the service according to the command if there is no such a parameter, and removing display of the command and replacing the display of the command with a display of the result of the performance of the service,
wherein the user's input comprises at least one start identifying character, at least one termination identifying character, and command text which is input between the at least one start identifying character and the at least one termination identifying character.

16. A user device comprising:
a display;
a memory configured to store a command table for an intelligent service; and
at least one processor configured to:
control a selection of a predetermined button of a keypad displayed on the display,
in response to the selection of the predetermined button of the keypad, cause the display to display at least one identifying character into the text input field,
in response to receiving an input of a command when the at least one identifying character is displayed, cause the display to display the inputted command after the at least one identifying character, and
control the execution according to the inputted command after the at least one identifying character so that a result of the executed command is inputted and displayed in the text input field,
wherein the at least one processor is further configured to replace the display of the command on the display when the result of the command is displayed in the text input field.

17. The user device of claim 16, wherein the at least one processor is further configured to display at least one command candidate group to be displayed on the command candidate region in response to the at least one identifying character or the command input.

18. The user device of claim 16, wherein the at least one processor is further configured to:
determine performance of the command if at least one termination identifying characters is inputted,
extract the command between the at least one identifying character and the at least one termination identifying character when the performance of the command is determined, and
control the performance of the command in response to the extracted command.

19. The user device of claim 18, wherein the at least one processor is further configured to:
determine whether the extracted command corresponds to a command designated in the command table,
control background performance of the command if the command is a command that is in the command table, and
control performance of the command corresponding to the command by being linked with an external server if the command is a command that is not in the command table.

20. The user device of claim 18, wherein, if the predetermined button is selected in a state where a result according to the search is outputted in the text input field, the at least one processor is further configured to restore a screen in a state before the result is outputted through the text input field.

21. An apparatus for supporting an intelligent service, the apparatus comprising:
a display;
a touch panel layered on the display;
a keypad user interface configured to provide a keypad on a performance screen of the display;
an input manager configured to:
support a character input by the keypad,
input a result transmitted from at least one processor to a text input field of the performance screen, and
remove and replace a character of a command type of a previously inputted start identifier, command and termination identifier displayed in the text input field with a text of the result when the result is inputted in the text input field;
the at least one processor configured to:
obtain a result by performance of an internal service or an external service for the command according to a result of analysis on the command of a command parser, and
control an output of the obtained result, if an input of a text of the command type of the start identifier, the command, and the termination identifier;
the command parser configured to:
extract a command between the start identifier and the termination identifier if the text is transmitted, analyze whether the extracted command corresponds to a command designated in a command table, and provide a result of the analysis to the at least one processor;

a network binder configured to obtain a dynamic result for the command from the external service through a service application program interface or web parsing if the command is transmitted from the at least one processor; and the command table configured to store preset commands and service information corresponding to each of the commands.

22. A system for supporting an intelligent service, the system comprising:

a user device configured to:
control an input of at least one start identifying character, a command, and at least one termination identifying character according to a user's input or a selection of a smart conversion button of a keypad, display the input of the at least one start identifying character, the command, and the at least one termination identifying character according to the user's input or the selection of the smart conversion button of the keypad, perform an intelligent service according to a command between the at least one start identifying character and a least one termination identifying character through an internal or external server, and display a result of the performance of the intelligent service in the text input field; and an integrated server configured to:
generate a result by performing an intelligent service according to the command, and provide the generated result to the user device when performance of the intelligent service is requested from the user device, wherein the user device is further configured to remove display of the command and replace the display of the command with a display of the result of the performance of the intelligent service in the text input field when the result of the performance of the intelligent service is displayed in the text input field.

23. The system of claim 22, wherein the integrated server is further configured to:

determine whether the command may be performed, perform the intelligent service, transmit a result of the performance to the user device if the command may be performed, determine a content server that may perform the intelligent service if the command may not be performed, obtain a result for the intelligent service by being linked with the determined content server, and transmit the obtained result to the user device.

24. A non-transitory computer readable recording medium with instructions stored thereon, said instructions, when executed by a processor of a user device, direct the user device to:

process a display of a text input field and a keypad on a performance screen of an application, control an input of at least one start identifying character, a command, and at least one termination identifying character according to a user's input or a selection of a smart conversion button using the keypad, display the input of the at least one start identifying character, the command, and the at least one termination identifying character according to the user's input or the selection of the smart conversion button of the keypad, extract a command between the at least one start identifying character and the at least one termination identifying character when the termination identifier is inputted, obtain a result after performing a service according to the extracted command, and remove display of the command and replace the display of the command with a display of the obtained result in the text input field.

* * * * *